(12) United States Patent
Watanuki et al.

(10) Patent No.: US 10,078,182 B2
(45) Date of Patent: Sep. 18, 2018

(54) SEMICONDUCTOR DEVICE AND METHOD FOR MANUFACTURING THE SAME

(71) Applicants: Renesas Electronics Corporation, Tokyo (JP); Photonics Electronics Technology Research Association, Tokyo (JP)

(72) Inventors: Shinichi Watanuki, Hitachinaka (JP); Akira Mitsuiki, Tokyo (JP); Atsuro Inada, Hitachinaka (JP); Tohru Mogami, Tokyo (JP); Tsuyoshi Horikawa, Tokyo (JP); Keizo Kinoshita, Tokyo (JP)

(73) Assignees: RENESAS ELECTRONICS CORPORATION, Tokyo (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 15/243,746

(22) Filed: Aug. 22, 2016

(65) Prior Publication Data

US 2017/0068051 A1    Mar. 9, 2017

(30) Foreign Application Priority Data

Sep. 4, 2015  (JP) .................................. 2015-174393

(51) Int. Cl.
*G02B 6/12* (2006.01)
*G02B 6/136* (2006.01)
(Continued)

(52) U.S. Cl.
CPC ............. *G02B 6/136* (2013.01); *G02B 6/122* (2013.01); *G02F 1/025* (2013.01);
(Continued)

(58) Field of Classification Search
CPC .... G02B 6/12002; G02B 6/132; G02B 6/136; G02B 2006/12061; G02B 2006/121;
(Continued)

(56) References Cited

U.S. PATENT DOCUMENTS 7,161,248 B2 * 1/2007 Karasawa ........... H01L 23/5227
257/200
9,087,725 B2 * 7/2015 Lee ......................... H01L 21/76
(Continued)

FOREIGN PATENT DOCUMENTS

JP        2003-114515 A      4/2003

*Primary Examiner* — Thomas A Hollweg
*Assistant Examiner* — Guy Anderson
(74) *Attorney, Agent, or Firm* — McGinn I.P. Law Group, PLLC.

(57) ABSTRACT

When an optical waveguide is formed, an area of an opening of a resist mask is equal to an area of a semiconductor layer for a dummy pattern exposed from the resist mask, and the semiconductor layer for the dummy pattern exposed from the resist mask has a uniform thickness in a region in which the dummy pattern is formed. As a result, an effective pattern density does not change in etching the semiconductor layer for the dummy pattern, and accordingly, it is possible to form a rib-shaped optical waveguide having desired dimensions and a desired shape.

14 Claims, 30 Drawing Sheets

(51) Int. Cl.
*G02B 6/122* (2006.01)
*G02F 1/025* (2006.01)

(52) U.S. Cl.
CPC ............... *G02B 6/12004* (2013.01); *G02B 2006/12061* (2013.01); *G02B 2006/12097* (2013.01); *G02F 2201/063* (2013.01); *G02F 2201/066* (2013.01); *G02F 2202/105* (2013.01)

(58) Field of Classification Search
CPC ... H01L 21/74; H01L 21/3086; H01L 21/302; H01L 21/30635; H01L 21/30612; H01L 21/30621; H01L 21/30604; H01L 21/76877; H01L 31/0232; H01L 31/02327; H01L 31/58
USPC .................................................. 385/129–132
See application file for complete search history.

(56) References Cited

U.S. PATENT DOCUMENTS

| | | | |
|---|---|---|---|
| 9,261,649 B2* | 2/2016 | Kitamura | G02B 6/136 |
| 2001/0037994 A1* | 11/2001 | Ezaki | C23C 14/48 |
| | | | 216/62 |
| 2003/0146485 A1* | 8/2003 | Ezaki | C23C 14/48 |
| | | | 257/499 |
| 2008/0197362 A1* | 8/2008 | Hisamoto | G02B 6/13 |
| | | | 257/86 |
| 2014/0284723 A1* | 9/2014 | Lee | H01L 27/0924 |
| | | | 257/369 |
| 2015/0043867 A1* | 2/2015 | Kono | G02F 1/2257 |
| | | | 385/3 |
| 2015/0260915 A1* | 9/2015 | Kitamura | G02B 6/136 |
| | | | 385/131 |

* cited by examiner

SEMICONDUCTOR DEVICE AND METHOD FOR MANUFACTURING THE SAME

CROSS-REFERENCE TO RELATED APPLICATION

The present application claims priority from Japanese Patent Application No. 2015-174393 filed on Sep. 4, 2015, the content of which is hereby incorporated by reference into this application.

TECHNICAL FIELD OF THE INVENTION

The present invention relates to a semiconductor device and a technique for manufacturing the semiconductor device. For example, the present invention is suitably applicable to manufacture of a semiconductor device in which a silicon photonics device including a silicon waveguide having a rib structure is built.

BACKGROUND OF THE INVENTION

Japanese Patent Application Laid-Open Publication No. 2003-114515 (Patent Document 1) describes a method for designing a mask. In the method, a region in which a dummy pattern can be disposed in a mask is determined on the basis of a mask pattern layout, and then, assuming that the dummy pattern is uniformly disposed in the whole region in which the dummy pattern can be disposed, a layout of the dummy pattern is determined so that values of parameters which are calculated in consideration of a dummy circuit pattern formed corresponding to the dummy pattern and a circuit pattern meet a standard.

SUMMARY OF THE INVENTION

A pattern density of an optical waveguide in a silicon photonics technique is generally low, and a ratio of an area occupied by the optical waveguide to a semiconductor chip is, for example, approximately 5%. In view of this, in forming an optical waveguide by processing a semiconductor layer by dry etching, a plurality of dummy patterns are disposed, for example, in a region in which the optical waveguide is not formed in order to suppress a phenomenon (micro-loading effect) that etching rate varies due to sparseness and denseness of patterns.

However, in a case where a rib-shaped optical waveguide is formed, it is necessary to precisely process a semiconductor layer composed of a single layer by performing etching two or three times. This requires that an effective area of the semiconductor layer to be etched be within a certain range in a region in which a plurality of dummy patterns are disposed.

Other objects and novel characteristics of the present invention will be apparent from the description of the present specification and the accompanying drawings.

A semiconductor device according to an embodiment of the present invention includes: a semiconductor substrate; a first insulating film that is formed on the semiconductor substrate; a rib-shaped optical waveguide that is formed on the first insulating film and composed of a semiconductor layer; and a second insulating film that is formed on the first insulating film so as to cover the optical waveguide. Furthermore, a plurality of dummy patterns composed of the semiconductor layer are formed around the optical waveguide, and a thickness of an outer peripheral portion of each of the dummy patterns is larger than that of a central portion of each of the dummy patterns.

A method for manufacturing a semiconductor device according to an embodiment of the present invention includes the step of separating a semiconductor layer for a first optical waveguide, a semiconductor layer for a second optical waveguide, a semiconductor layer for a first dummy pattern, and a semiconductor layer for a second dummy pattern from one another by performing dry etching of a semiconductor layer that constitutes an SOI substrate, through use of a first resist mask. Furthermore, the method includes the step of processing a portion of the semiconductor layer for the first optical waveguide and a portion of the semiconductor layer for the first dummy pattern into a first thickness by dry etching through use of a second resist mask, and the step of processing a portion of the semiconductor layer for the second optical waveguide and a portion of the semiconductor layer for the second dummy pattern into a second thickness by dry etching through use of a third resist mask. In addition, the second resist mask covers an outer peripheral portion of the semiconductor layer for the first dummy pattern, and the third resist mask covers an outer peripheral portion of the semiconductor layer for the second dummy pattern.

According to an embodiment of the present invention, it is possible to achieve a semiconductor device having an optical waveguide whose dimensions and shape have small variations.

BRIEF DESCRIPTIONS OF THE DRAWINGS

Figure 9:
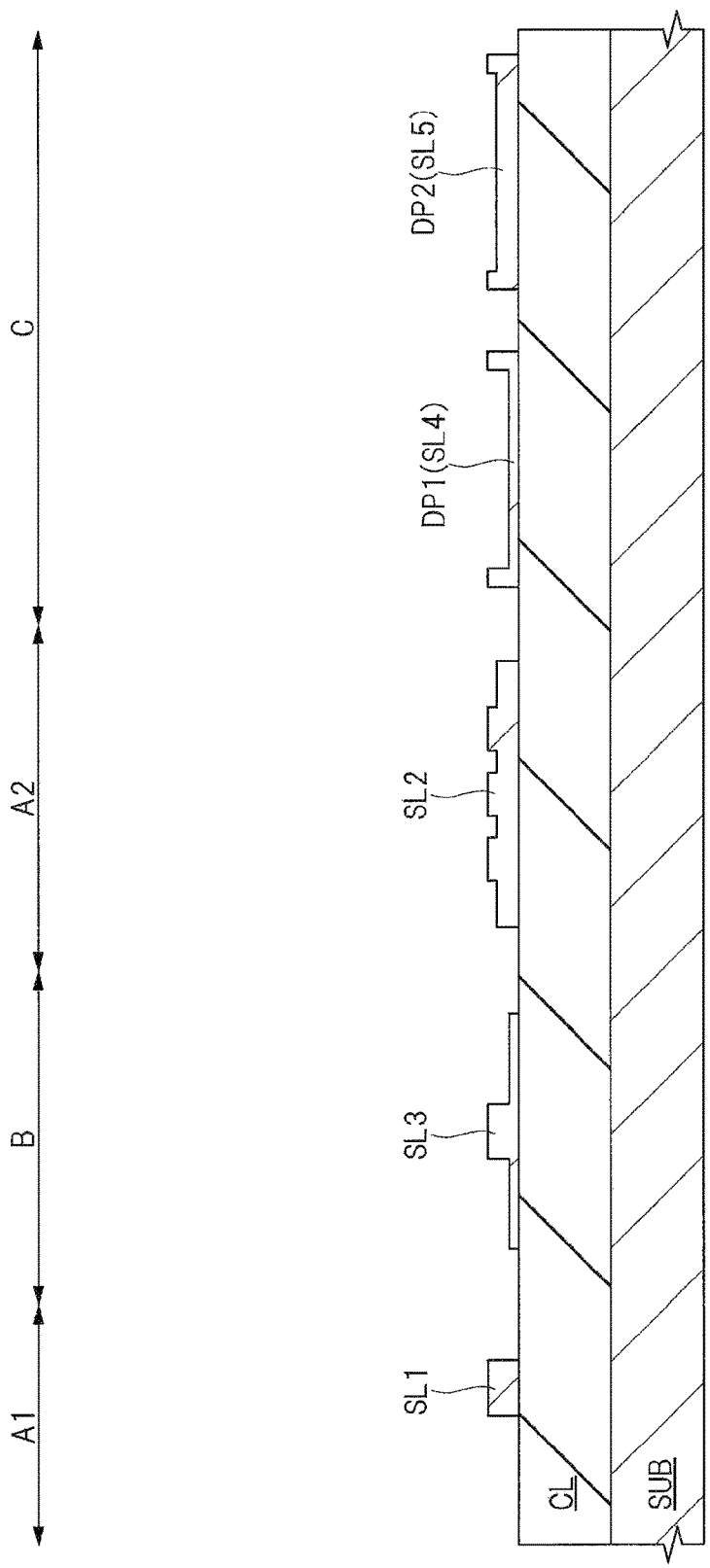
FIG. 9 is a cross-sectional view of a main part illustrating the process of manufacturing the semiconductor device subsequent to FIG. 8.
Figure 12A:
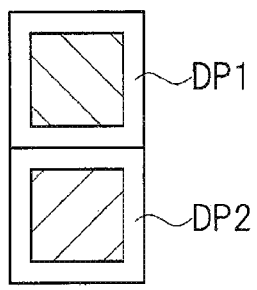
FIG. 12A is a plan view of a main part illustrating a first modification example of shapes of dummy patterns according to the first embodiment.
Figure 12B:
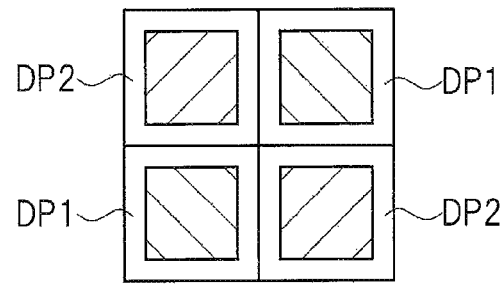
Figure 13:
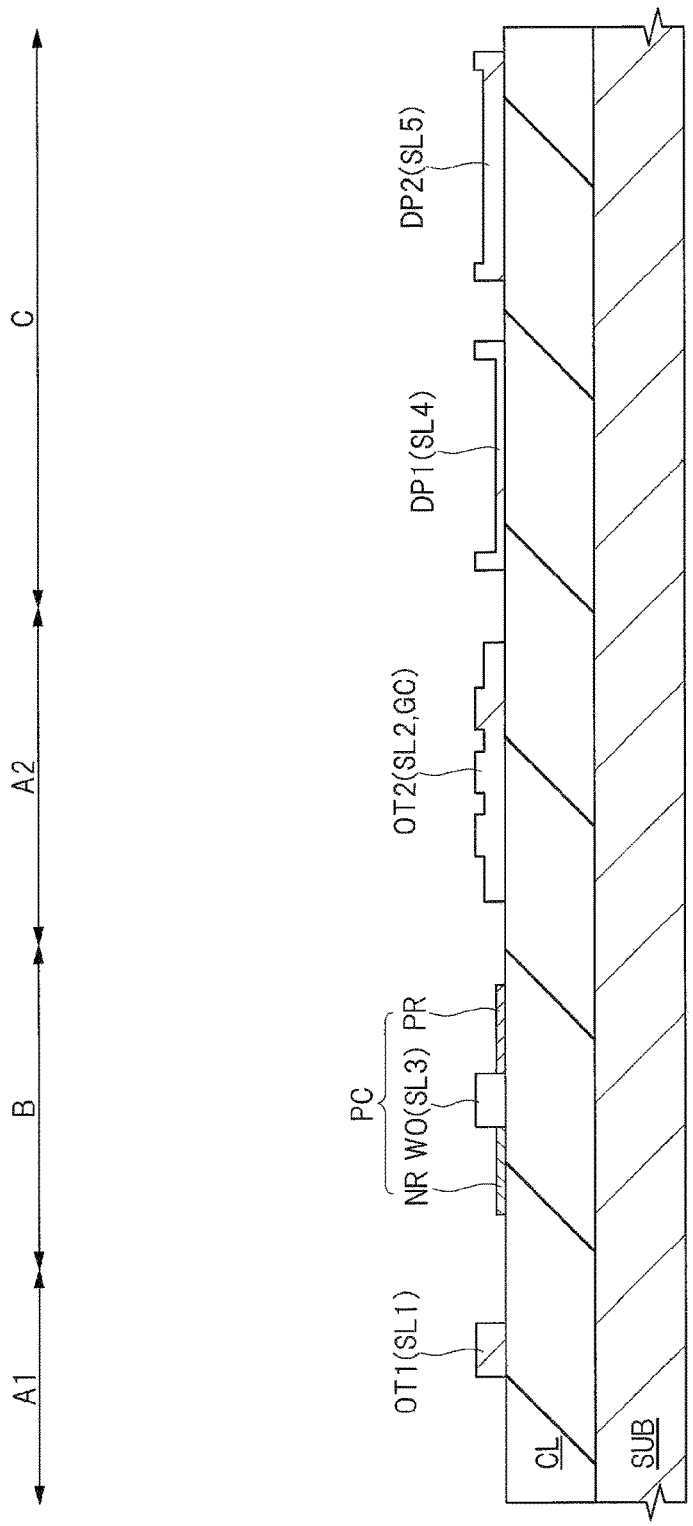
Figure 14:
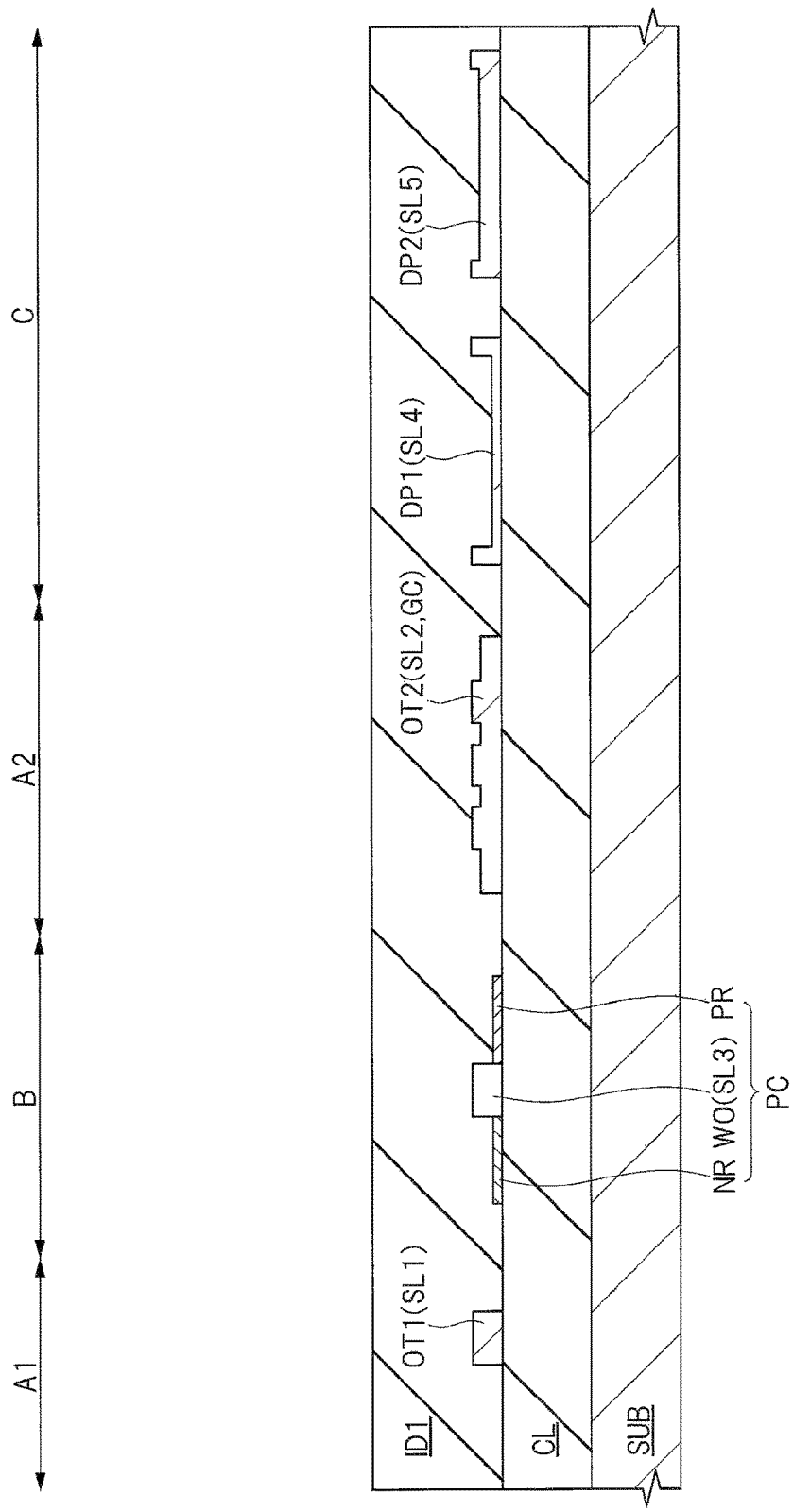
Figure 15:
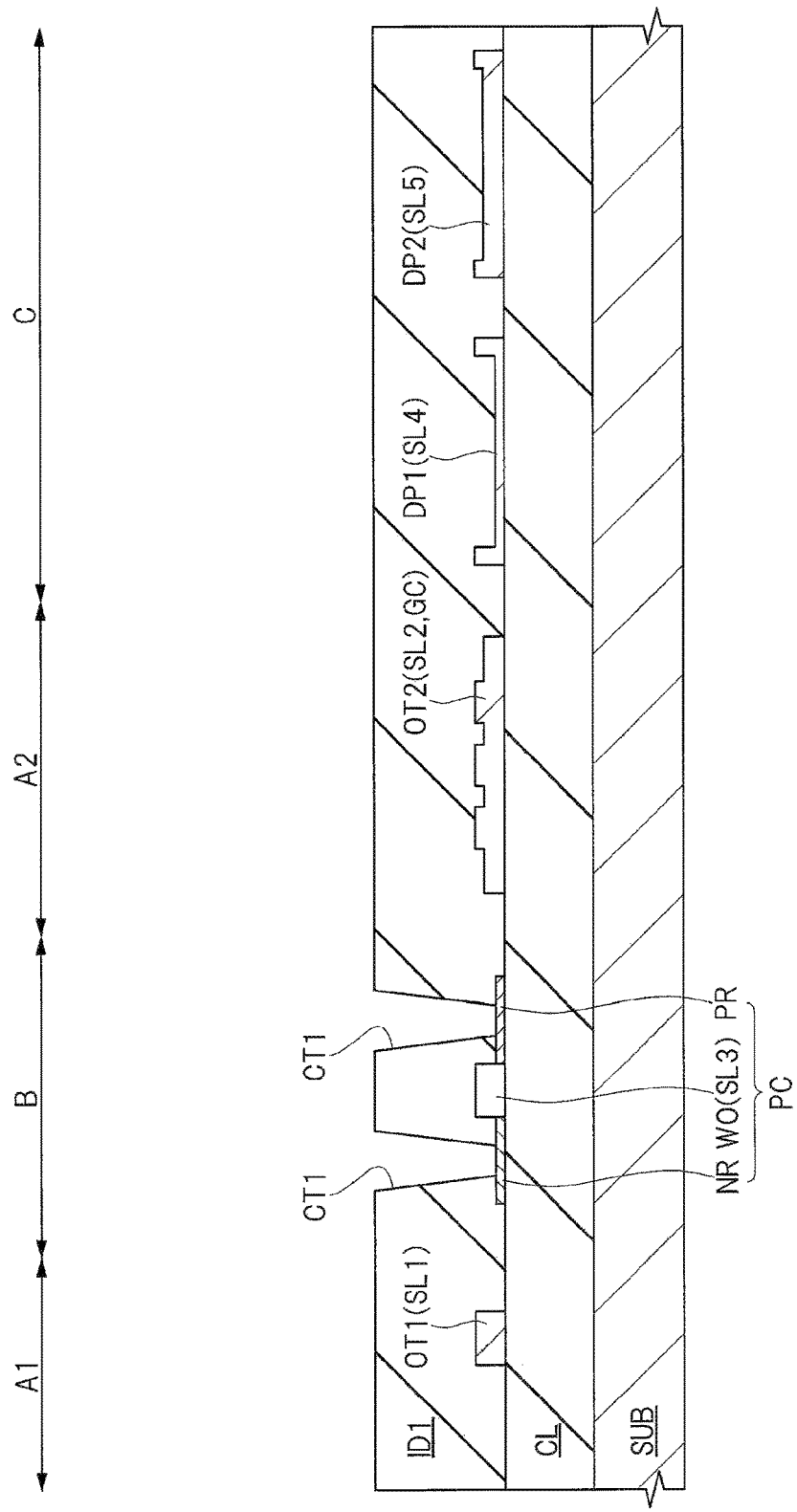
Figure 16:
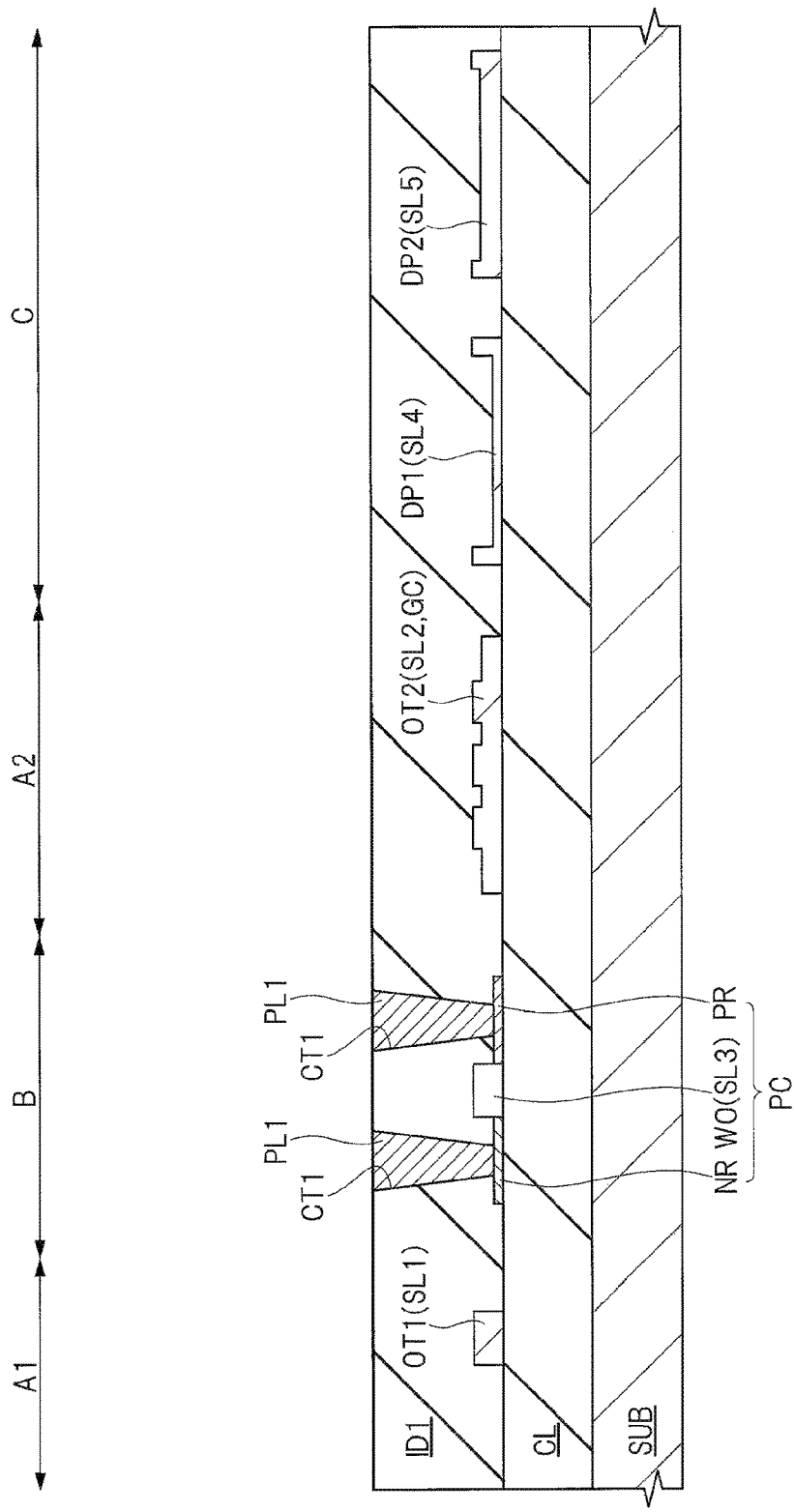
Figure 17:
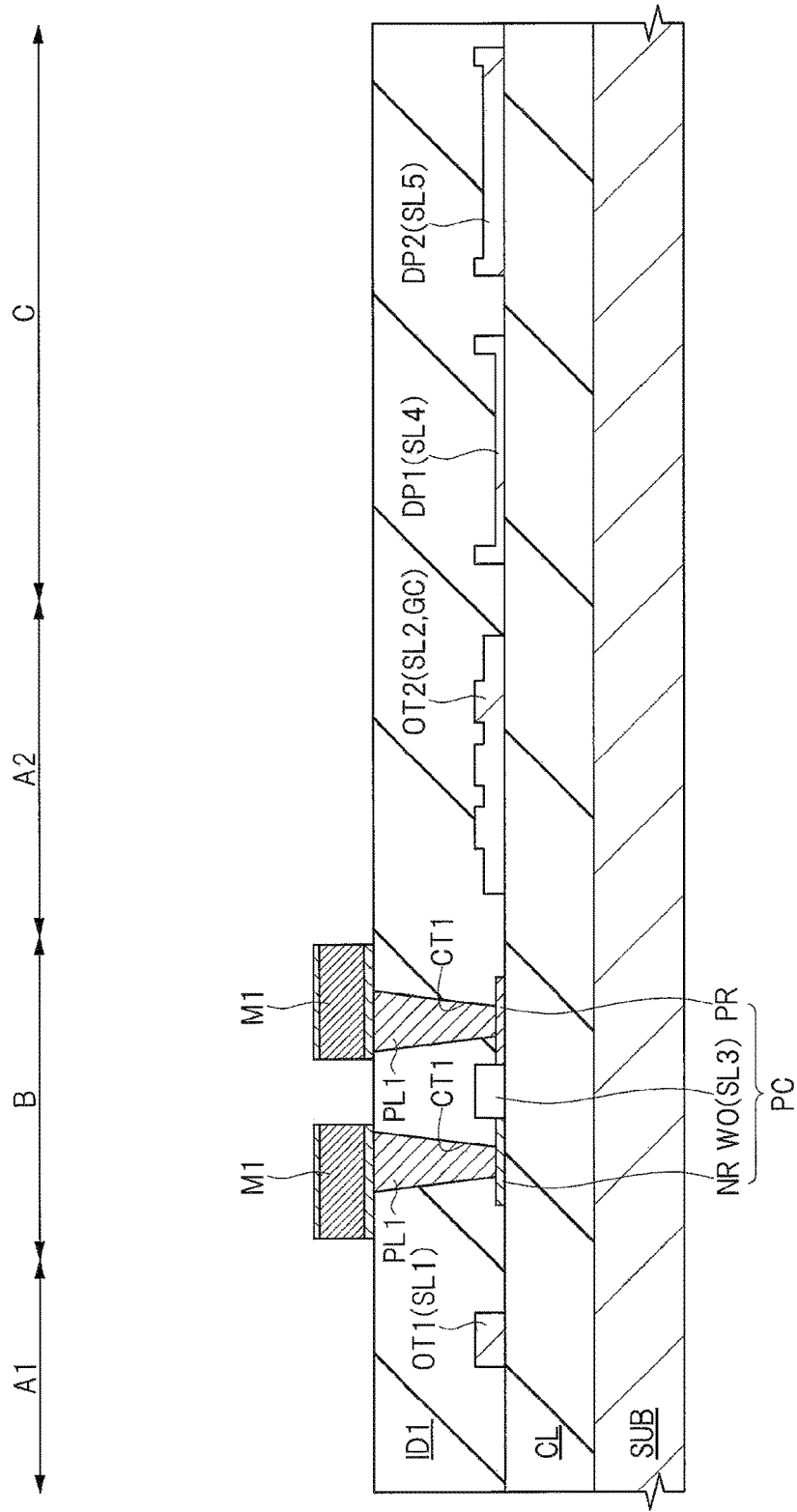
Figure 18:
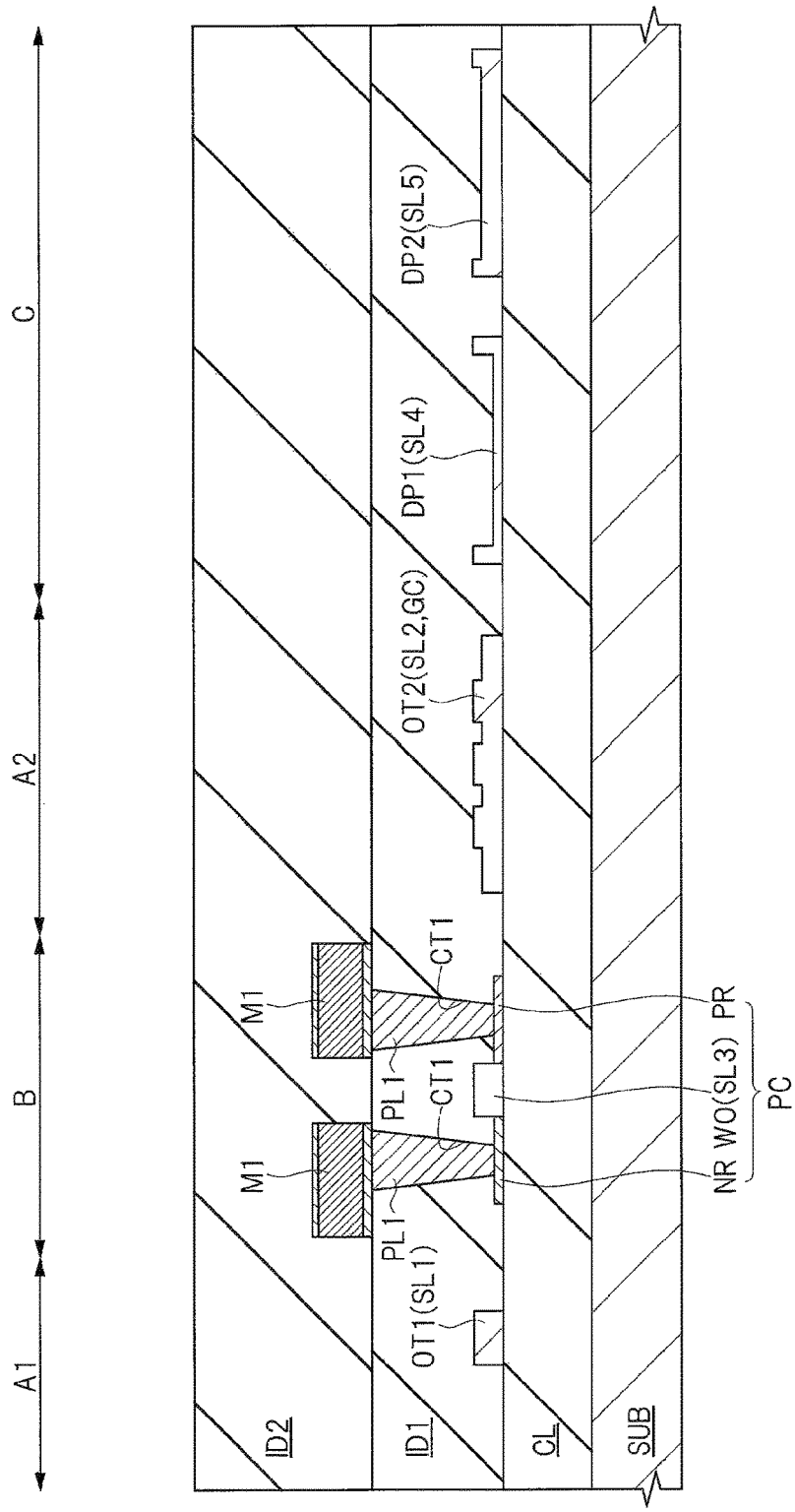
Figure 19:
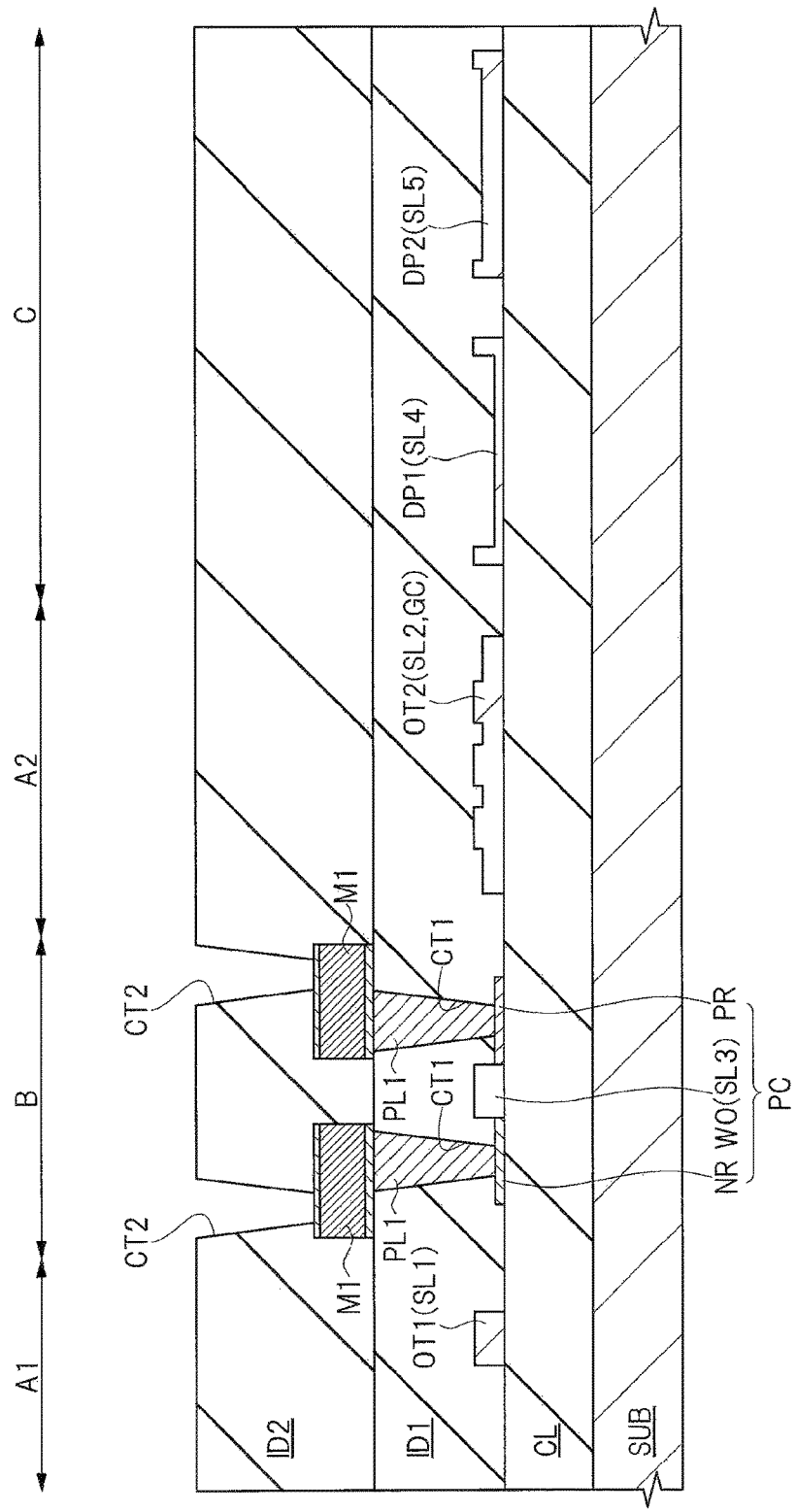
Figure 20:
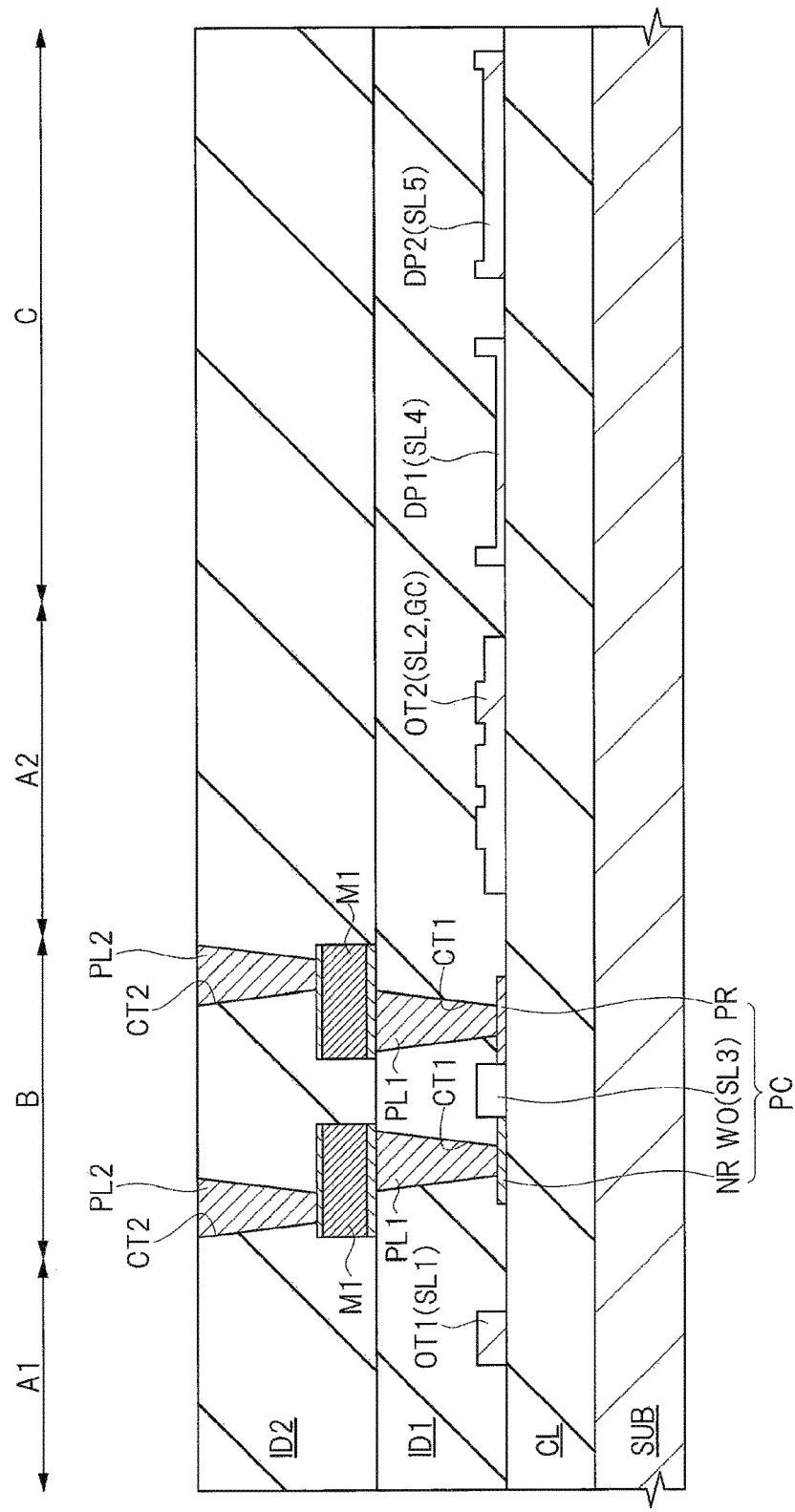
Figure 21:
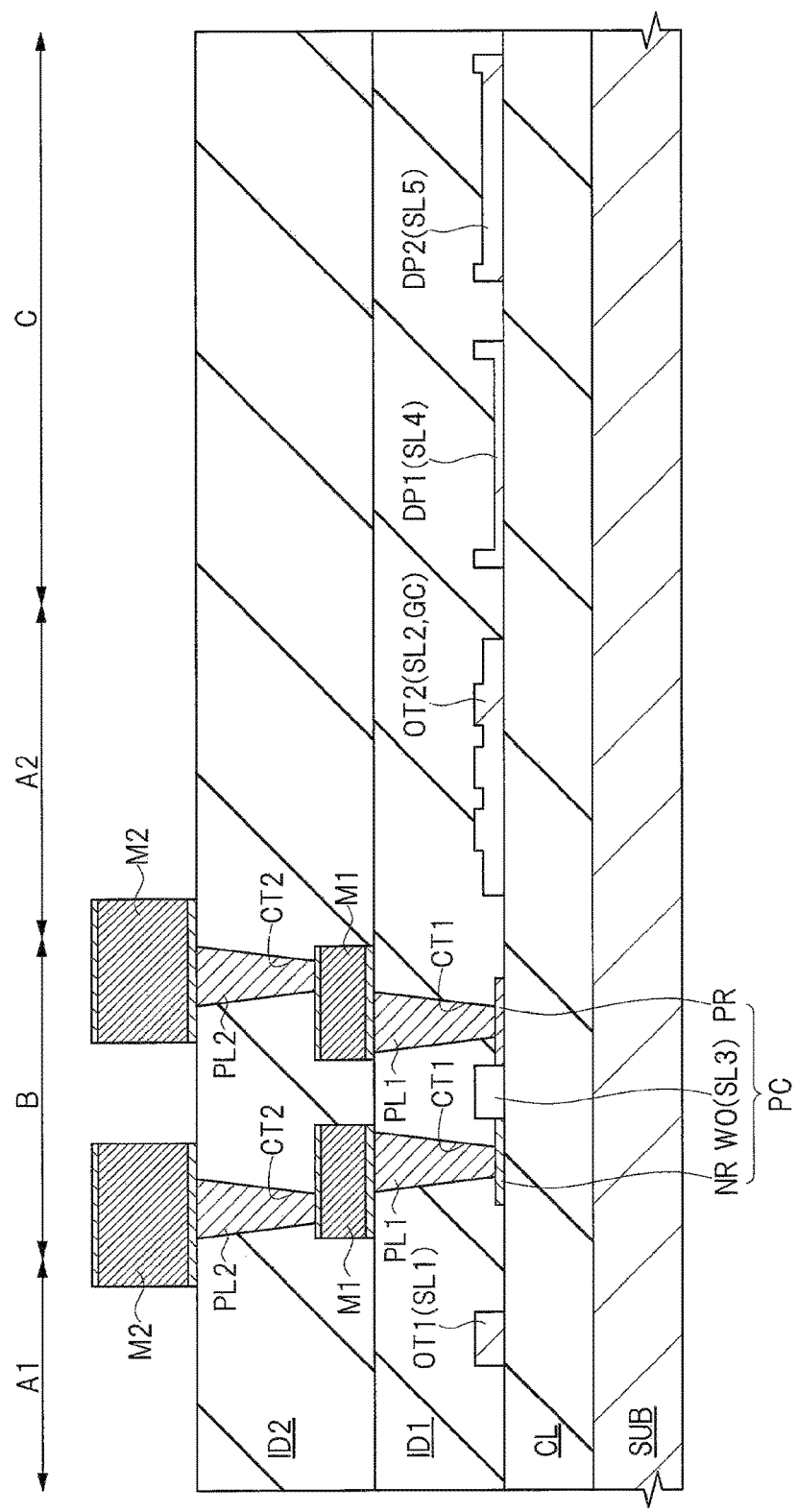
Figure 22:
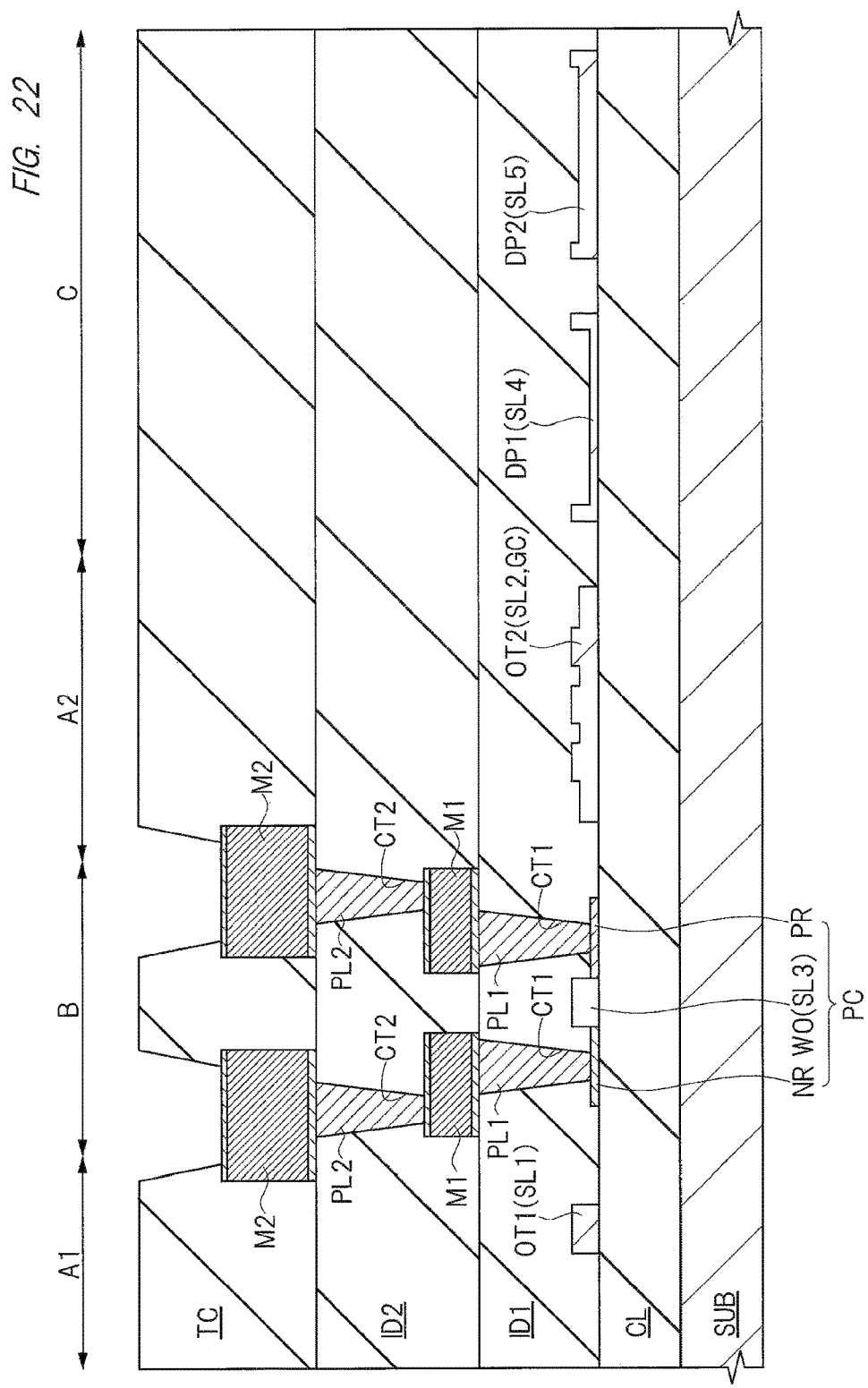
Figure 23:
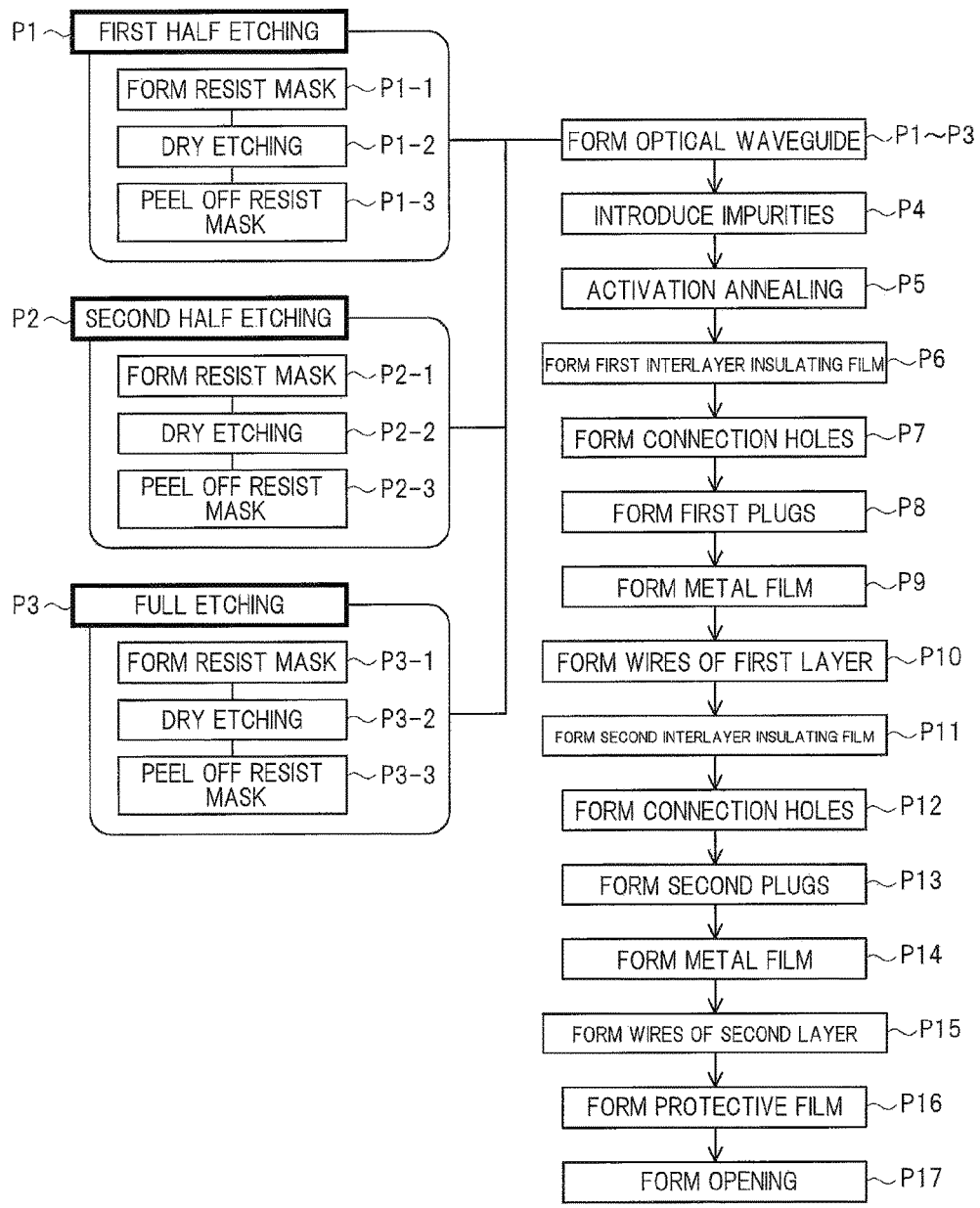
Figure 24:
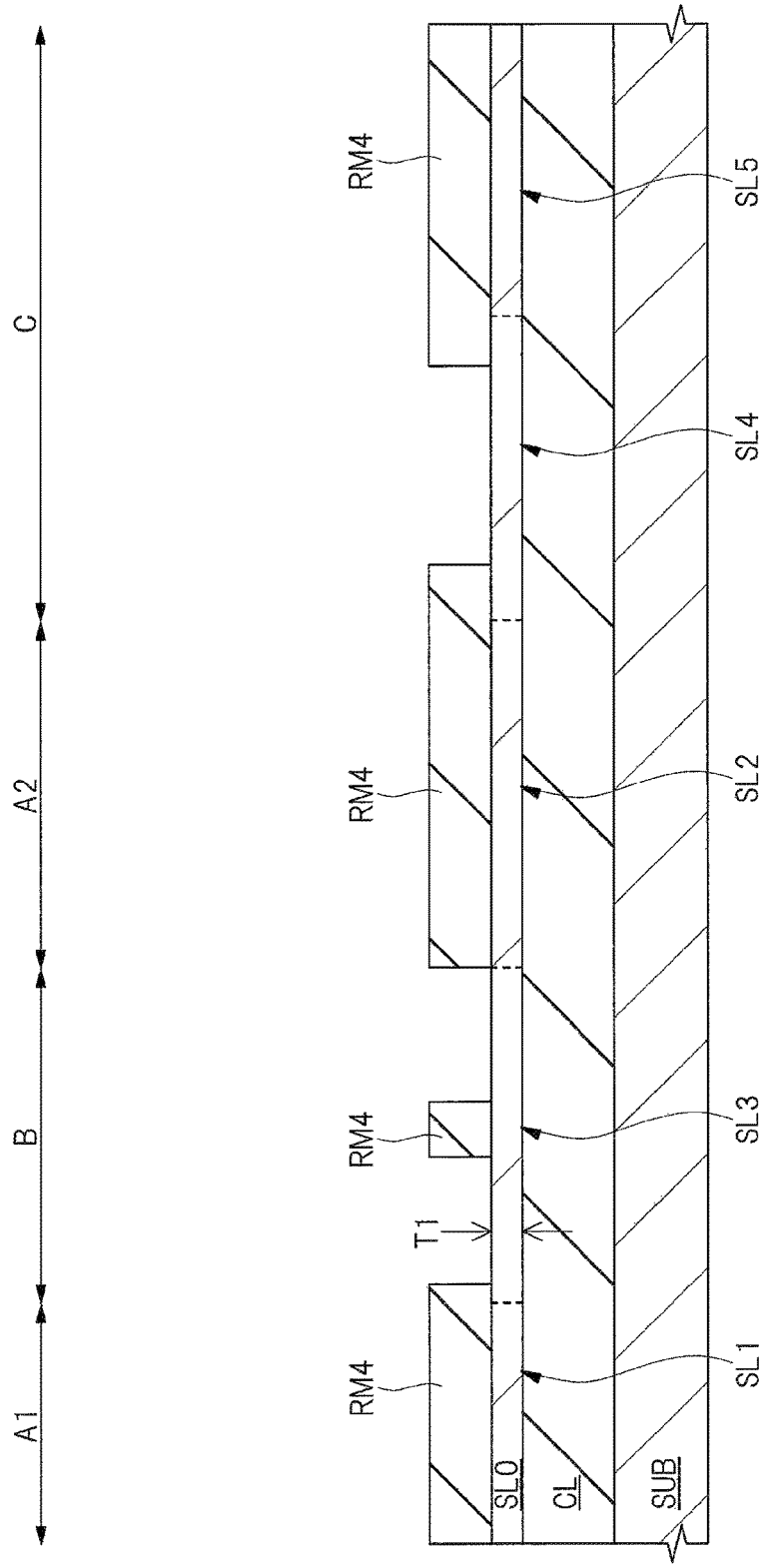
Figure 25:
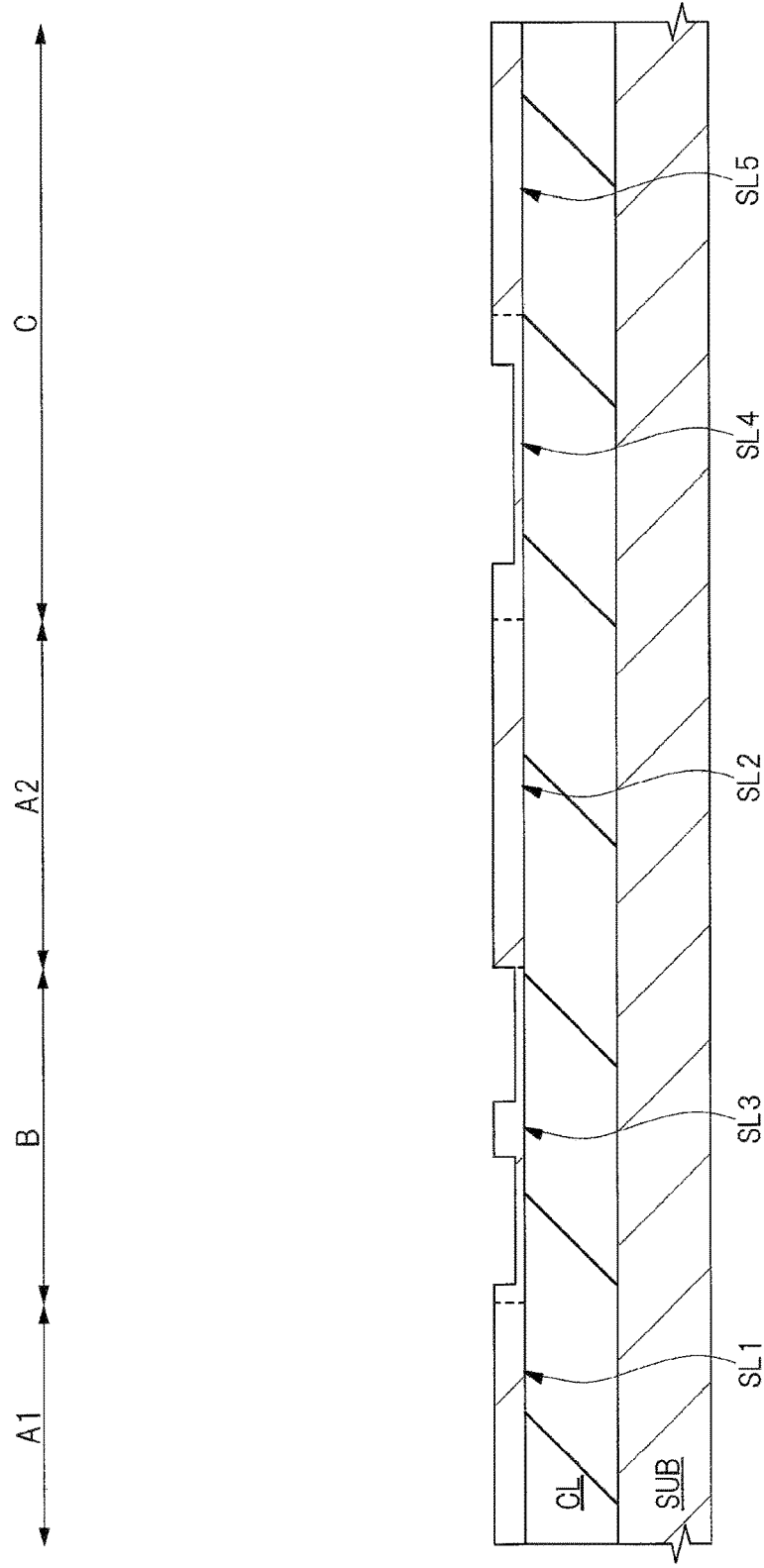
Figure 26:
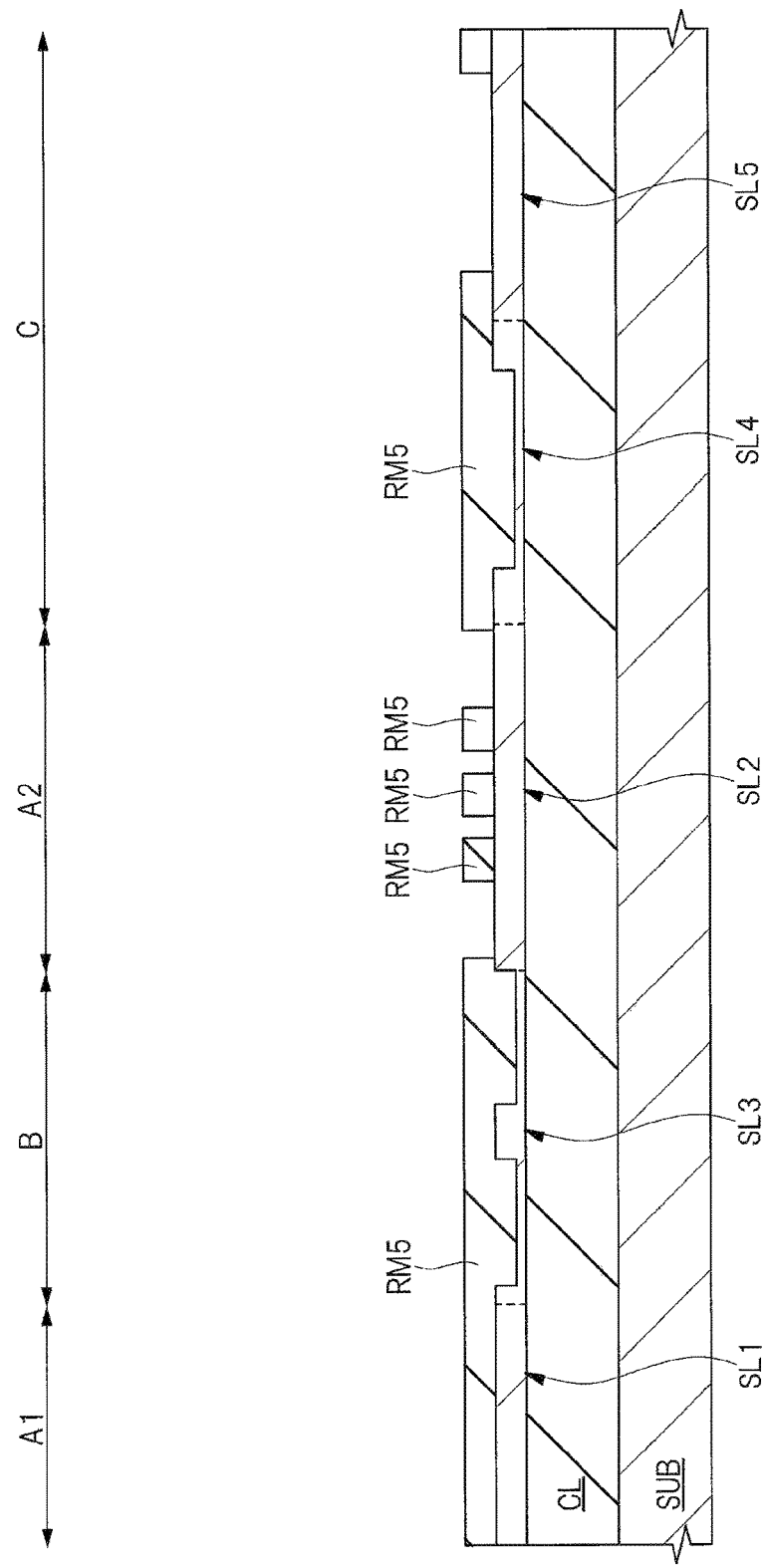
Figure 27:
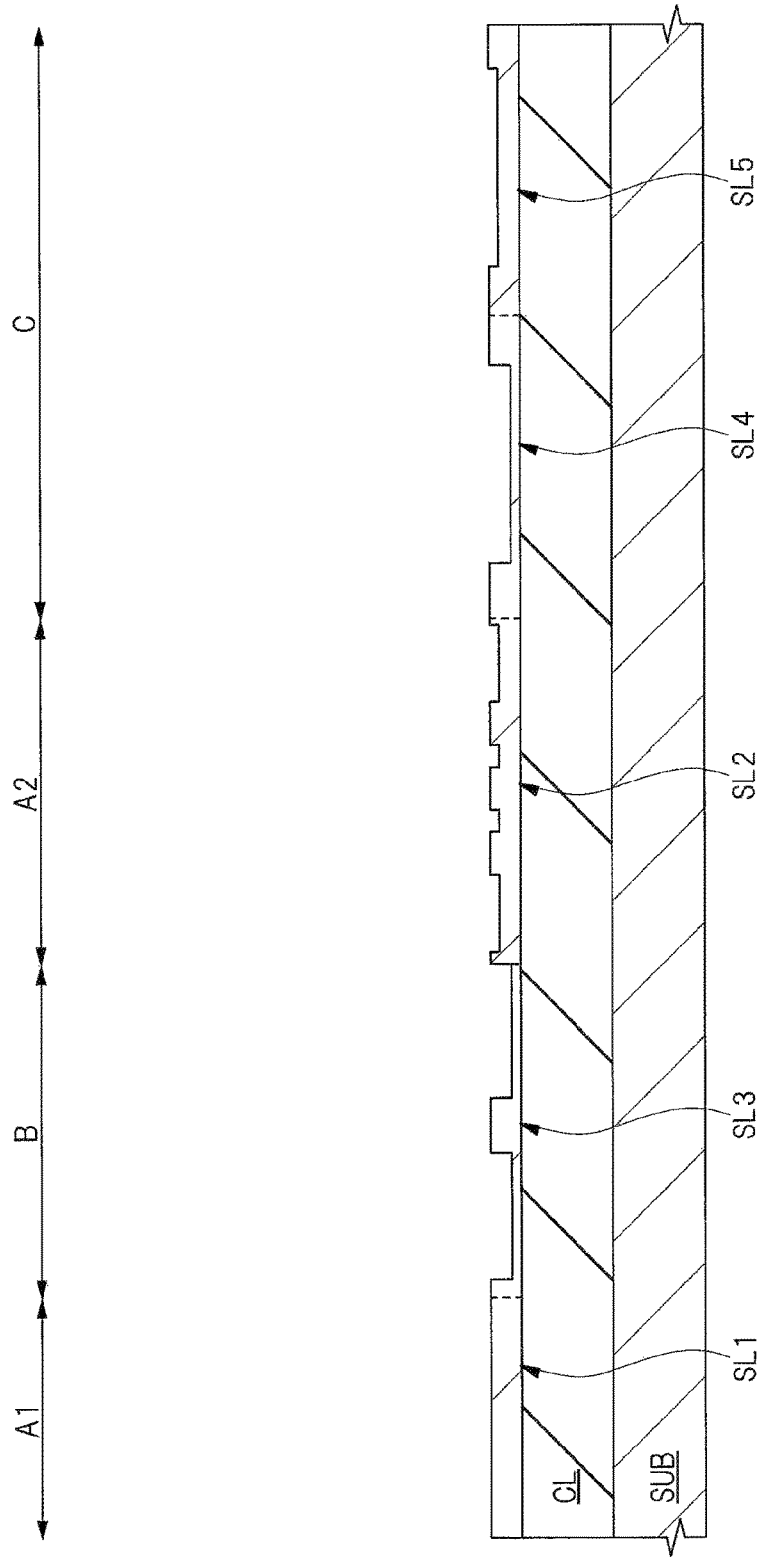
Figure 28:
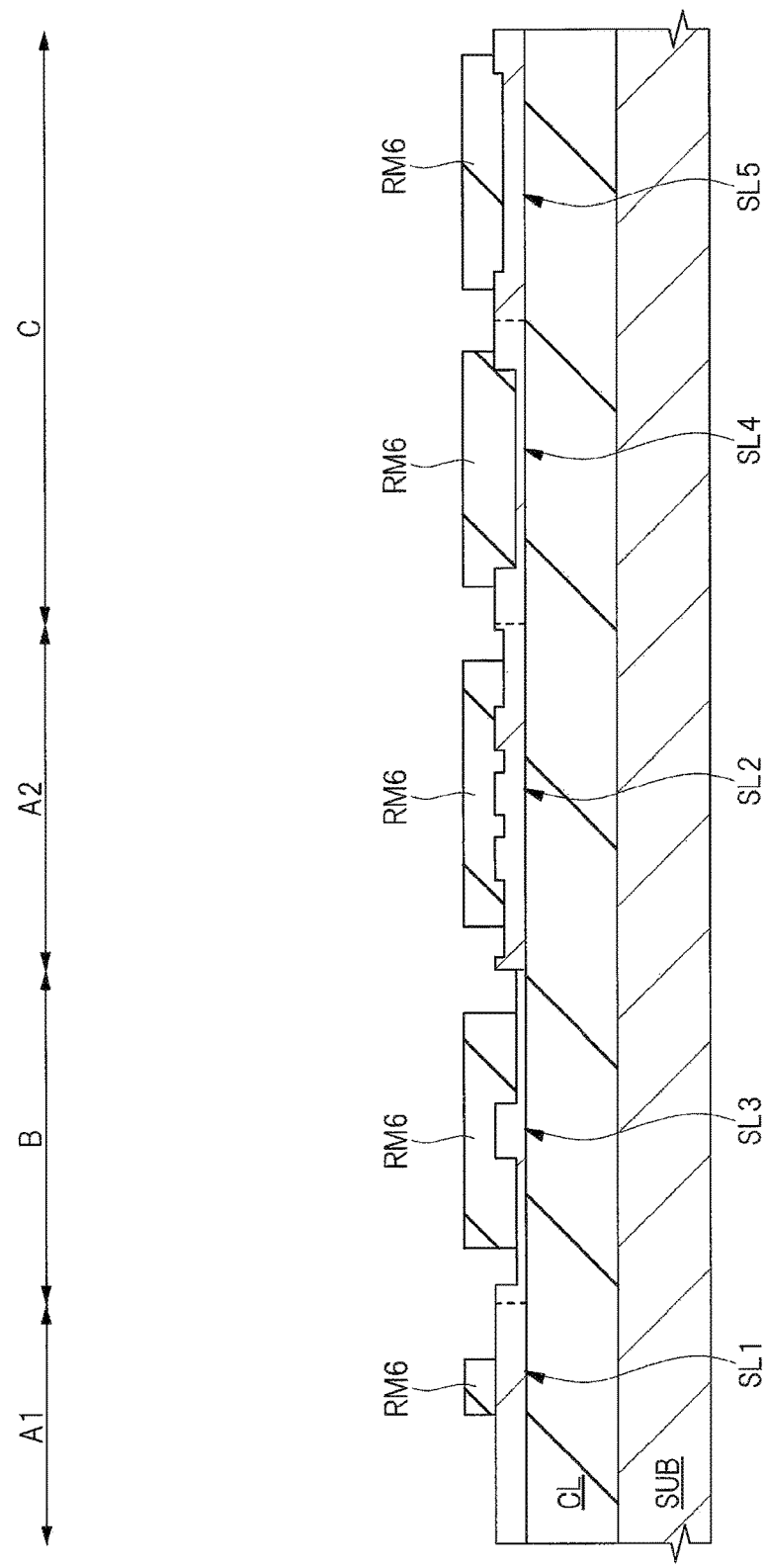
Figure 29:
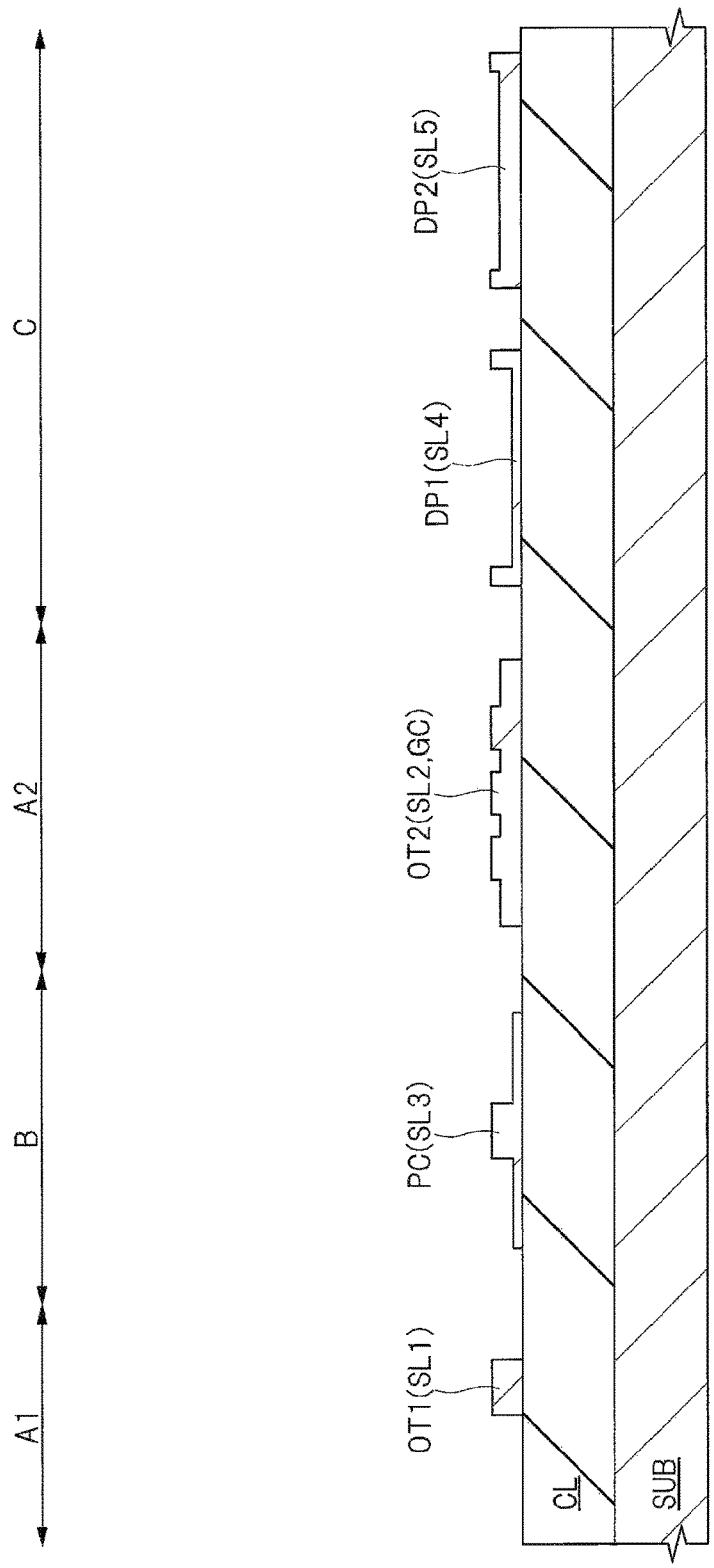
Figure 30:
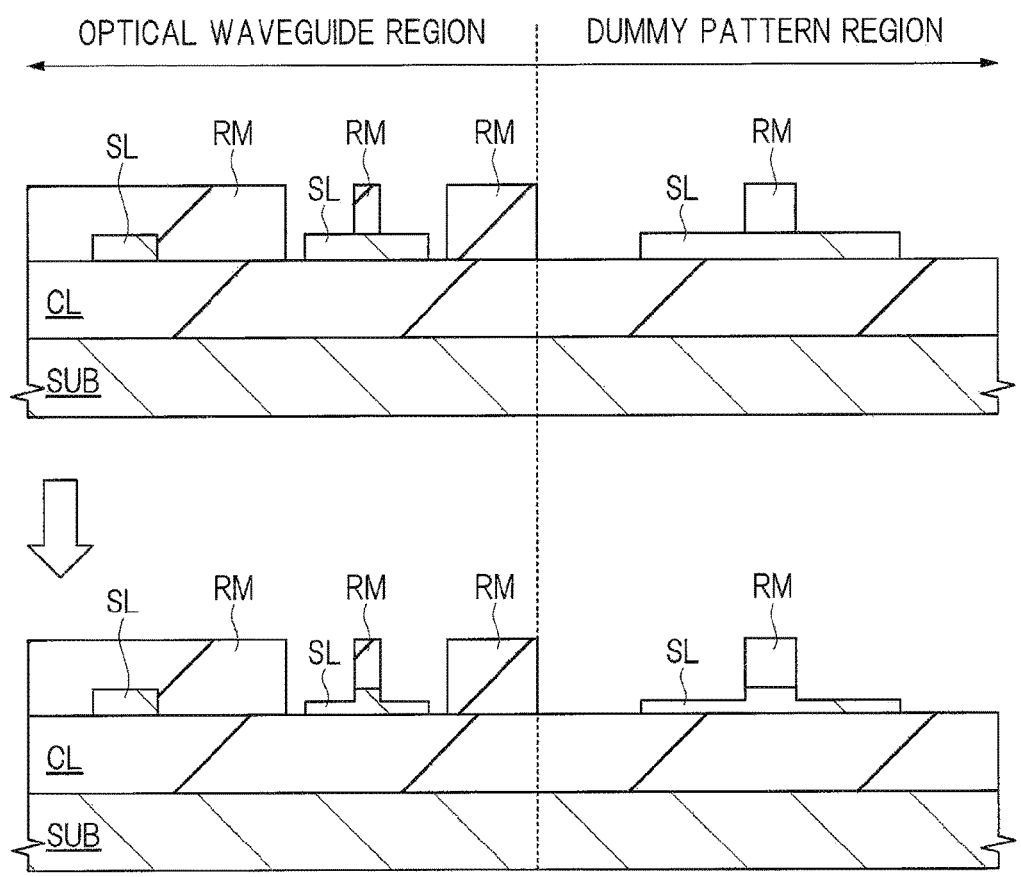
Figure 31:
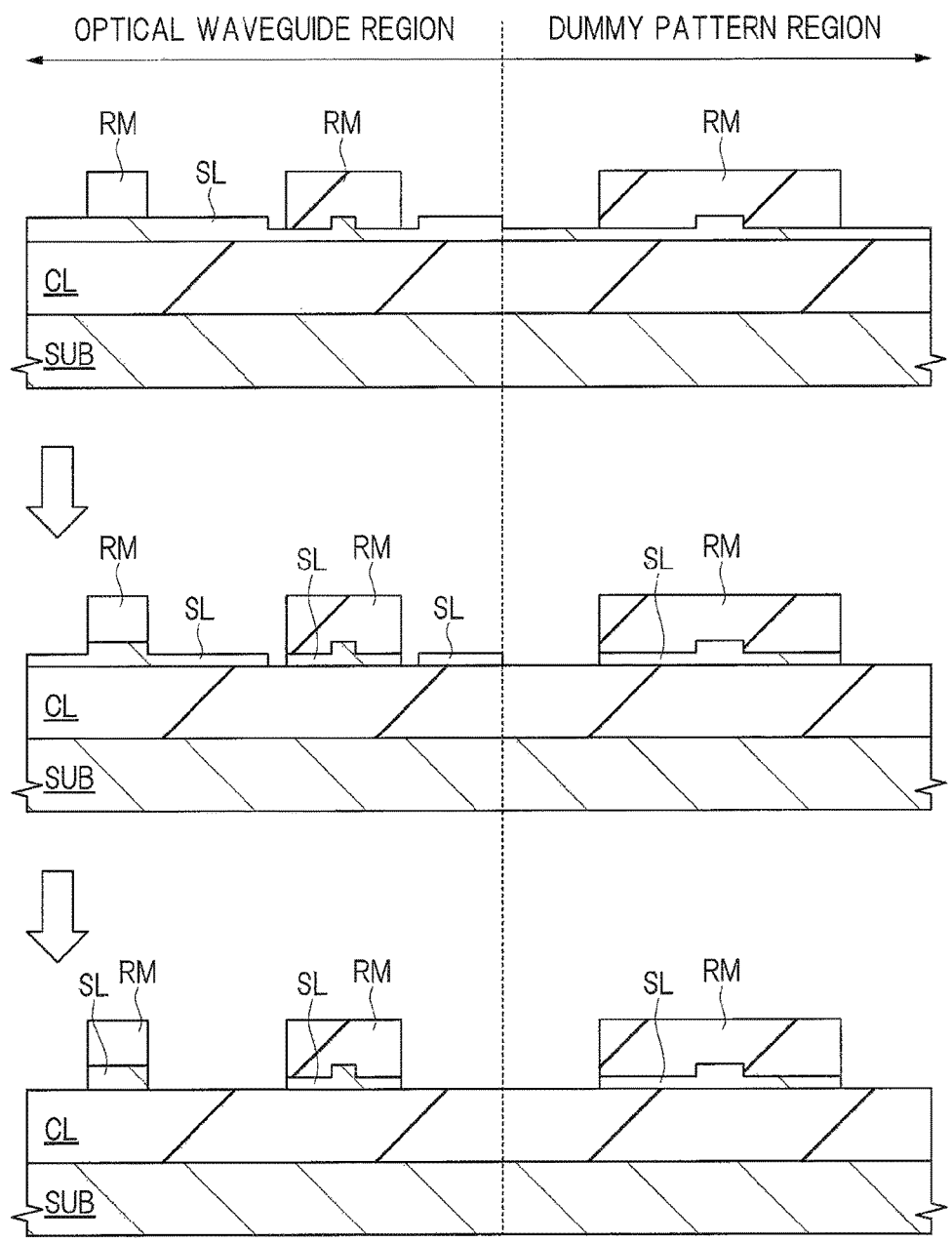

FIG. 12B a plan view of a main part illustrating a second modification example of shapes of dummy patterns according to the first embodiment;

FIG. 13 is a cross-sectional view of a main part illustrating the process of manufacturing the semiconductor device subsequent to FIG. 9;

FIG. 14 is a cross-sectional view of a main part illustrating the process of manufacturing the semiconductor device subsequent to FIG. 13;

FIG. 15 is a cross-sectional view of a main part illustrating the process of manufacturing the semiconductor device subsequent to FIG. 14;

FIG. 16 is a cross-sectional view of a main part illustrating the process of manufacturing the semiconductor device subsequent to FIG. 15;

FIG. 17 is a cross-sectional view of a main part illustrating the process of manufacturing the semiconductor device subsequent to FIG. 16;

FIG. 18 is a cross-sectional view of a main part illustrating the process of manufacturing the semiconductor device subsequent to FIG. 17;

FIG. 19 is a cross-sectional view of a main part illustrating the process of manufacturing the semiconductor device subsequent to FIG. 18;

FIG. 20 is a cross-sectional view of a main part illustrating the process of manufacturing the semiconductor device subsequent to FIG. 19;

FIG. 21 is a cross-sectional view of a main part illustrating the process of manufacturing the semiconductor device subsequent to FIG. 20;

FIG. 22 is a cross-sectional view of a main part illustrating the process of manufacturing the semiconductor device subsequent to FIG. 21;

FIG. 23 is a process flow chart illustrating a process of manufacturing a semiconductor device according to a second embodiment;

FIG. 24 is a cross-sectional view of a main part illustrating the process of manufacturing the semiconductor device according to the second embodiment;

FIG. 25 is a cross-sectional view of a main part illustrating the process of manufacturing the semiconductor device subsequent to FIG. 24;

FIG. 26 is a cross-sectional view of a main part illustrating the process of manufacturing the semiconductor device subsequent to FIG. 25;

FIG. 27 is a cross-sectional view of a main part illustrating the process of manufacturing the semiconductor device subsequent to FIG. 26;

FIG. 28 is a cross-sectional view of a main part illustrating the process of manufacturing the semiconductor device subsequent to FIG. 27;

FIG. 29 is a cross-sectional view of a main part illustrating the process of manufacturing the semiconductor device subsequent to FIG. 28;

FIG. 30 is a cross-sectional view illustrating a main part of optical waveguides and dummy patterns for describing a mode of etching in a case where an area of an opening of a resist mask is different from an area of a semiconductor layer exposed from the resist mask from the start; and FIG. 31 is a cross-sectional view illustrating a main part of optical waveguides and dummy patterns for describing a mode of etching in a case where an area of an opening of a resist mask is different from an area of a semiconductor layer exposed from the resist mask in the middle of etching of the semiconductor layer.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle.

Also, even when mentioning that constituent elements or the like are "made of A," "made up of A," "having A," or "including A" in the embodiments below, elements other than A are of course not excluded except the case where it is particularly specified that A is the only element thereof. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, in some drawings used in the embodiments, hatching is used even in a plan view so as to make the drawings easy to see. Also, components having the same function are denoted by the same reference symbols throughout the drawings for describing the embodiments, and the repetitive description thereof is omitted. Hereinafter, the present embodiment will be described in detail with reference to the drawings.

First Embodiment

In recent years, a technique of realizing an optical communication module achieved by manufacturing a transmission line made of silicon (Si) and using an optical circuit constituted by this transmission line as a platform to integrate various optical devices and electronic devices, that is, a silicon photonics technique has been actively developed.

The technique disclosed in the first embodiment is one applied to an optical device in particular among various devices that constitute a semiconductor device using a silicon photonics technique. Accordingly, in the following description, structures of optical devices integrated on an SOI (Silicon On Insulator) substrate and a method for manufacturing the optical devices will be described. Furthermore, in the following description, a transmission line for optical signal and an optical modulator are exemplified among various optical devices, and a multilayer wiring having a two-layer structure is exemplified, but the present embodiment is not limited to these.

<Structure of Semiconductor Device>

Figure 1:
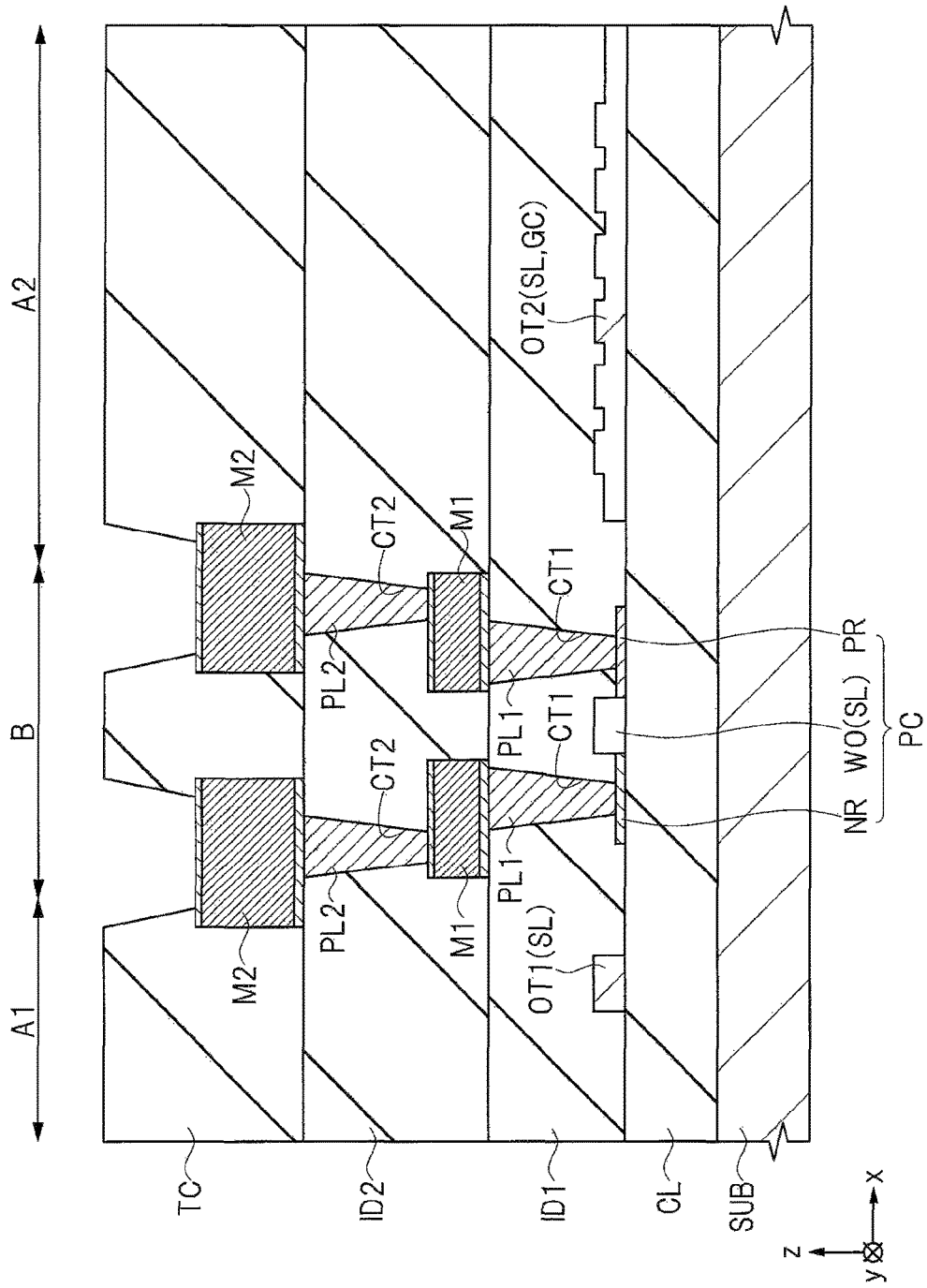
FIG. 1 is a cross-sectional view illustrating a main part of a semiconductor device according to a first embodiment.

A structure of a semiconductor device according to the first embodiment will be described with reference to FIG. 1. FIG. 1 is a cross-sectional view illustrating a main part of the semiconductor device according to the first embodiment and exemplifies a transmission line for optical signal and an optical modulator. In FIG. 1, a first optical waveguide is formed in an A1 region, a second optical waveguide is formed in an A2 region, and an optical modulator is formed in a B region.

<Transmission Line for Optical Signal>

As illustrated in FIG. 1, a transmission line for optical signal (also referred to as an optical signal line) has various structures such as a first optical waveguide (also referred to as a core layer) OT1 and a rib-shaped second optical waveguide (also referred to as a core layer) OT2. Each pattern density of the first optical waveguide OT1 and the second optical waveguide OT2 is low, and the a ratio of an area occupied by the optical waveguides to a semiconductor chip is, for example, less than 5% in some cases even if an optical modulator and the like that will be described later are added.

The first optical waveguide OT1 and the second optical waveguide OT2 are constituted by a semiconductor layer (also referred to as an SOI layer) SL which is made of silicon (Si) and formed on a main surface of a semiconductor substrate SUB made of monocrystalline silicon (Si) with an insulating layer (also referred to as a BOX layer or a lower cladding layer) CL therebetween. A thickness of the insulating layer CL is relatively large, for example, approximately 2 µm to 3 µm. This allows electrostatic capacitance between the semiconductor substrate SUB and the semiconductor layer SL to be kept low.

The first optical waveguide OT1 extends in a direction vertical to the paper surface on which FIG. 1 is drawn (a y direction in FIG. 1). Accordingly, guided light introduced into the first optical waveguide OT1 travels in the direction vertical to the paper surface. A cross section (an xz plane orthogonal to the y direction) of the first optical waveguide OT1 that is orthogonal to the direction vertical to the paper surface has a quadrangular shape, the height of the first optical waveguide OT1 (a dimension in a top and bottom direction on the paper surface (a z direction in FIG. 1)) is, for example, approximately 200 nm to 300 nm, and the width of the first optical waveguide OT1 (a dimension in a left and right direction on the paper surface (an x direction in FIG. 1)) is, for example, approximately 300 nm to 500 nm.

Also, the second optical waveguide OT2 extends in the left and right direction on the paper surface (the x direction in FIG. 1). Accordingly, guided light introduced into the second optical waveguide OT2 travels in the left and right direction on the paper surface. The second optical waveguide OT2 constitutes, for example, a grating coupler GC having a continuous rib structure. The grating coupler GC is an element which couples external laser light with guided light propagating in the second optical waveguide OT2 or extracts such laser light. The guided light is diffracted and radiated in a specific direction by periodic refractive-index modulation (formed due to the irregularities on a surface) provided along a propagation direction on an optical waveguide surface. The guided light exponentially attenuates as the guided light propagates, and a light intensity distribution of the diffracted and radiated light also has an exponential distribution accordingly. In the second optical waveguide OT2, the height of a thick portion of the semiconductor layer SL (a dimension in the top and bottom direction on the paper surface (the z direction in FIG. 1)) is, for example, approximately 200 nm to 300 nm, and the height of a thin portion of the semiconductor layer SL (a dimension in the top and bottom direction on the paper surface (the z direction in FIG. 1)) is, for example, approximately 100 nm.

Furthermore, the first optical waveguide OT1 and the second optical waveguide OT2 are covered with a first interlayer insulating film (also referred to as an upper cladding layer) ID1, a second interlayer insulating film ID2, and a protective film TC. The first interlayer insulating film ID1 and the second interlayer insulating film ID2 are made, for example, of silicon oxide ($SiO_2$), and a thickness of each of the first interlayer insulating film ID1 and the second interlayer insulating film ID2 is, for example, approximately 2 µm to 3 µm. The protective film TC is made, for example, of silicon oxide or silicon oxynitride (SiON). A wire M1 of a first layer and a wire M2 of a second layer that will be described later are not formed above each of the first optical waveguide OT1 and the second optical waveguide OT2. In some cases, the protective film TC is not formed above the second optical waveguide OT2 which performs input and output of an optical signal to and from an outside.

<Optical Modulator>

As illustrated in FIG. 1, an optical modulator PC that converts an electric signal into an optical signal is constituted by the semiconductor layer SL that is formed on the main surface of the semiconductor substrate SUB with the insulating layer CL therebetween. In the first embodiment, an optical modulator having a pin structure will be described by way of example, but the first embodiment is not limited to this.

The semiconductor layer SL of the optical modulator PC has a rib structure. A thick portion (a rib portion) of the semiconductor layer SL serves as an optical waveguide (also referred to as a core layer) WO and extends in the direction vertical to the paper surface (the y direction in FIG. 1). Accordingly, guided light introduced into the optical waveguide WO travels in the direction vertical to the paper surface. The optical waveguide WO is formed of a pure semiconductor, i.e., an i-type (intrinsic) semiconductor.

P-type impurities are introduced into the semiconductor layer SL on one side (the right side in FIG. 1) of the optical waveguide WO to form a p-type semiconductor PR. The p-type semiconductor PR is formed in parallel with the optical waveguide WO. Furthermore, n-type impurities are introduced into the semiconductor layer SL on the other side (the left side in FIG. 1) of the optical waveguide WO to form an n-type semiconductor NR. The n-type semiconductor NR is formed in parallel with the optical waveguide WO. That is, the semiconductor layer SL between the p-type semiconductor PR and the n-type semiconductor NR is the optical waveguide WO composed of a pure semiconductor. This forms a pin structure.

A thickness of the semiconductor layer SL in which the p-type semiconductor PR is formed and a thickness of the semiconductor layer SL in which the n-type semiconductor NR is formed are smaller than a thickness of the semiconductor layer SL in which the optical waveguide WO is formed, and each height (a dimension in the top and bottom direction on the paper surface (the z-direction in FIG. 1)) of these thin portions of the semiconductor layers SL is, for example, approximately 50 nm.

Electrodes (first plugs PL1 that will be described later) are connected to the p-type semiconductor PR and the n-type semiconductor NR, respectively. A carrier density in the optical waveguide WO composed of the pure semiconductor changes due to application of a voltage to these electrodes, and a refractive index in the region changes accordingly. This changes an effective refractive index for light propagating in the optical modulator PC, thereby making it possible to change the phase of light output from the optical modulator PC.

The optical modulator PC is covered with the first interlayer insulating film ID1, and the wires M1 of the first layer are formed on an upper surface of the first interlayer insulating film ID1. The first interlayer insulating film ID1 is made, for example, of silicon oxide ($SiO_2$), and the thickness of the first interlayer insulating film ID1 is, for example, approximately 2 μm to 3 μm. Connection holes (also referred to as contact holes) CT1 that reach the p-type semiconductor PR and the n-type semiconductor NR, respectively, are formed in the first interlayer insulating film ID1. The first plugs PL1 whose main conductive material is, for example, tungsten (W) are embedded in the connection holes CT1. The p-type semiconductor PR and one of the wires M1 of the first layer are electrically connected to each other via one of the first plugs PL1, and the n-type semiconductor NR and another one of the wires M1 of the first layer are also electrically connected to each other via another one of the first plugs PL1. A main conductive material of the wires M1 of the first layer is, for example, aluminum (Al), copper (Cu), or an aluminum-copper alloy (an Al—Cu alloy).

Moreover, the wires M1 of the first layer are covered with the second interlayer insulating film ID2, and the wires M2 of the second layer are formed on an upper surface of the second interlayer insulating film ID2. The second interlayer insulating film ID2 is made, for example, of silicon oxide ($SiO_2$), and the thickness of the second interlayer insulating film ID2 is, for example, approximately 2 μm to 3 μm. Connection holes (also referred to as via holes) CT2 that reach the wires M1 of the first layer are formed in the second interlayer insulating film ID2. The second plugs PL2 whose main conductive material is tungsten (W) are embedded in the connection holes CT2, and the wires M1 of the first layer and the wires M2 of the second layer are electrically connected to each other via the second plugs PL2. A main conductive material of the wires M2 of the second layer is, for example, aluminum (Al), copper (Cu), or an aluminum-copper alloy (an Al—Cu alloy).

The wires M2 of the second layer are covered with the protective film TC, and a part of the protective film TC is opened so that upper surfaces of the wires M2 of the second layer are exposed therefrom. The protective film TC is made, for example, of silicon oxynitride (SiON).

<Method for Manufacturing Semiconductor Device>

Both of the second optical waveguide OT2 and the optical modulator PC have a rib shape and have different structures from each other as described above. Furthermore, a thickness of the thin portion of the semiconductor layer SL in the second optical waveguide OT2 is, for example, approximately 100 nm, whereas a thickness of the thin portion of the semiconductor layer SL in the optical modulator PC is, for example, approximately 50 nm. That is, a plurality of kinds of optical waveguides (three kinds in the first embodiment) having different structures need to be formed on the main surface of the insulating layer CL in the semiconductor device.

In order to efficiently propagate guided light, it is necessary to form optical waveguides with good reproducibility while suppressing variations in dimensions and shape. It is therefore desirable that the processing accuracy of the semiconductor layer SL be 5 nm or less. That is, it is necessary to form the plurality of kinds of optical waveguides having different structures from each other with processing accuracy of 5 nm or less.

However, the pattern density of all the optical waveguides including the transmission lines for optical signal (the first optical waveguide OT1 and the second optical waveguide OT2) described above, the optical modulator PC, and the like is low, and the ratio of the area occupied by the optical waveguides to a semiconductor chip is less than 5% in some cases. Furthermore, the ratio of the area occupied by the thin portion of the semiconductor layer SL to the semiconductor chip is less than 1% in some cases.

In a case where the pattern density relative to the semiconductor chip is low as described above, variations occur in dimensions and shape of processed optical waveguides.

Figure 2:
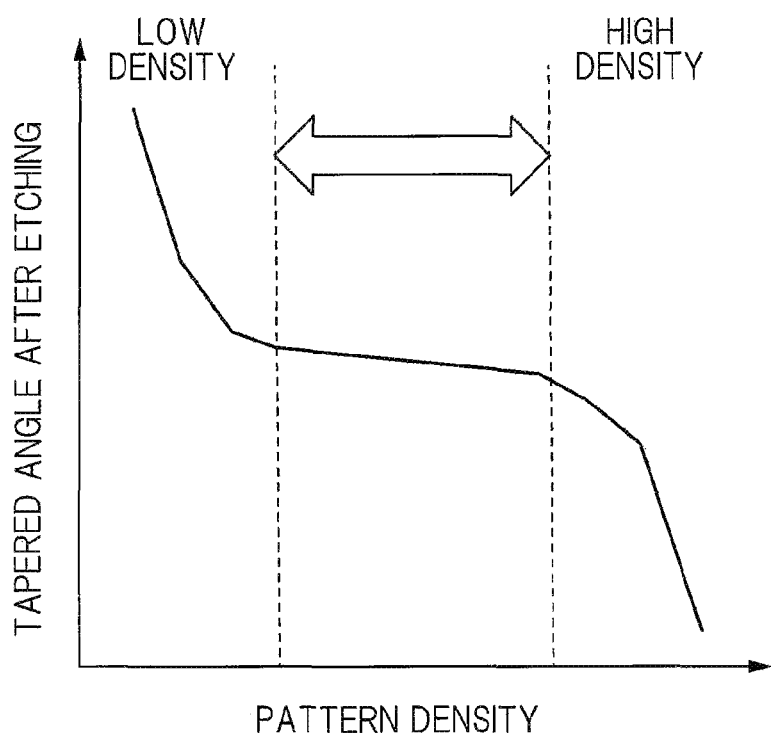
FIG. 2 is a graph for describing a relationship between tapered angles of optical waveguides and a pattern density according to the first embodiment.

For example, as illustrated in FIG. 2, tapered angles of the optical waveguides in shapes change depending on the pattern density of the optical waveguides. The tapered angles of the optical waveguides become larger as the pattern density becomes lower. This is because in a case where the pattern density is low, an etched amount of the semiconductor layer becomes relatively large, the amount of re-sticking of an etching product becomes large, and the optical waveguides have a forward tapered shape (lower surfaces of the optical waveguides are larger than upper surfaces thereof). Meanwhile, the tapered angles of the optical waveguides become smaller as the pattern density becomes higher. This is because in a case where the pattern density is high, an etched amount of the semiconductor layer becomes relatively small, the amount of re-sticking of an etching product becomes small, and the optical waveguides have an inverse tapered shape (upper surfaces of the optical waveguides are larger than lower surfaces thereof). If the pattern density is within a proper range, variations in dimensions and shapes of the optical waveguides can be suppressed, but since the pattern density of the optical waveguides is low as described above, the optical waveguides are likely to have a forward tapered shape.

In view of this, when the optical waveguides are formed, a plurality of dummy patterns are disposed in a region in which the optical waveguides are not formed, so that the pattern density of combining the optical waveguides and the dummy patterns is within a range (e.g., a range of the pattern density indicated by the arrow in FIG. 2) in which variations in dimensions and shapes of the optical waveguides can be suppressed. This makes it possible to form optical waveguides having desired dimensions and shapes.

However, the ratio of the area occupied by the optical waveguides to the semiconductor chip is approximately 5%, and the pattern density of the dummy patterns is higher than that of the optical waveguides. Accordingly, the pattern density of the dummy patterns is a factor that determines variations in dimensions and shapes of the optical waveguides. However, when rib-shaped optical waveguides are formed by processing a semiconductor layer by etching through use of a resist mask, the pattern density of the actually processed dummy patterns of the semiconductor layer is out of the range of the pattern density indicated by the arrow in FIG. 2 in some cases, even in a case where the layout of dummy patterns of the resist mask is designed so that the pattern density is within the range of the pattern density indicated by the arrow in FIG. 2. That is, it is concerned that optical waveguides having desired dimensions and shapes cannot be formed because the area of an opening of a resist mask is different from the area of a semiconductor layer exposed from the resist mask from the start or in the middle of etching of the semiconductor layer in a region in which the dummy patterns are formed.

Such an example described above will be described with reference to FIGS. 30 and 31. FIG. 30 is a cross-sectional view illustrating a main part of optical waveguides and dummy patterns for describing a mode of etching in a case where an area of an opening of a resist mask is different from an area of a semiconductor layer exposed from the resist mask from the start. FIG. 31 is a cross-sectional view illustrating a main part of optical waveguides and dummy patterns for describing a mode of etching in a case where an area of an opening of a resist mask is different from an area of a semiconductor layer exposed from the resist mask in the middle of etching of the semiconductor layer.

Also, as illustrated in FIG. 30, a rib-shaped semiconductor layer SL is formed by etching a patterned semiconductor layer SL from an upper surface thereof through use of a resist mask RM, and then processing portions of the semiconductor layer SL thinly. The area of an opening of the resist mask RM is different from the area of the semiconductor layer SL exposed from the resist mask RM from the start of etching. Accordingly, there is a possibility that the semiconductor layer SL may not be processed under an optimum etching condition in a case where the etching condition of the semiconductor layer SL is determined on the basis of mask data for preparing the resist mask RM.

As illustrated in FIG. 31, a rib-shaped semiconductor layer SL is formed by etching the semiconductor layer SL having thinly-processed portions thereof from an upper surface thereof through use of the resist mask RM, and then patterning the semiconductor layer SL. In this example, the area of the opening of the resist mask RM and the area of the semiconductor layer SL exposed from the resist mask RM are equal to each other at the start of etching but are different from each other in the middle of etching. Accordingly, there is a possibility that in a case where the etching condition of the semiconductor layer SL is determined on the basis of mask data for preparing the resist mask RM, the semiconductor layer SL may not be processed under an optimum etching condition in the middle of etching, although the semiconductor layer SL is processed under an optimum etching condition at the start.

For example, as illustrated in FIG. 2, even in a case where a resist mask is prepared from mask data in which a pattern density capable of controlling dimensions and shapes of a semiconductor layer is selected, the actual pattern density becomes lower than a planned pattern density, and therefore, optical waveguides having desired dimensions and shapes cannot be formed.

In particular, since the pattern density of dummy patterns is higher than that of optical waveguides, variations of dimensions and shapes of the optical waveguides appear remarkably in a case where the area of an opening of a resist mask is different from the area of a semiconductor layer exposed from the resist mask in a region in which the dummy patterns are formed.

In view of this, in the first embodiment, when rib-shaped optical waveguides having different structures from each other are formed, a semiconductor layer is processed so that the area of an opening of a resist mask is always equal to the area of the semiconductor layer exposed from the resist mask in a region in which dummy patterns are formed.

Figure 3:
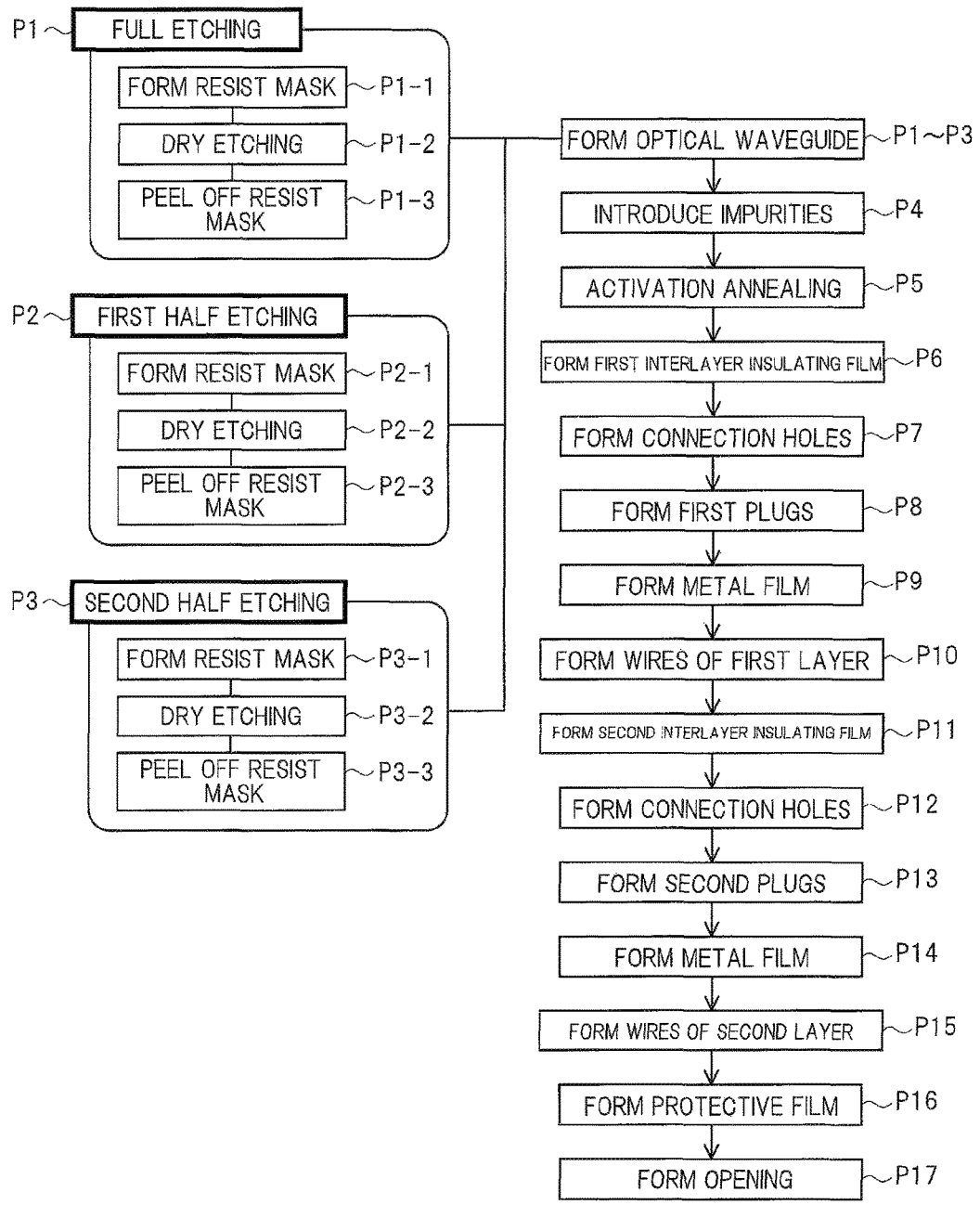
FIG. 3 is a process flow chart illustrating a process of manufacturing the semiconductor device according to the first embodiment.
Figure 10:
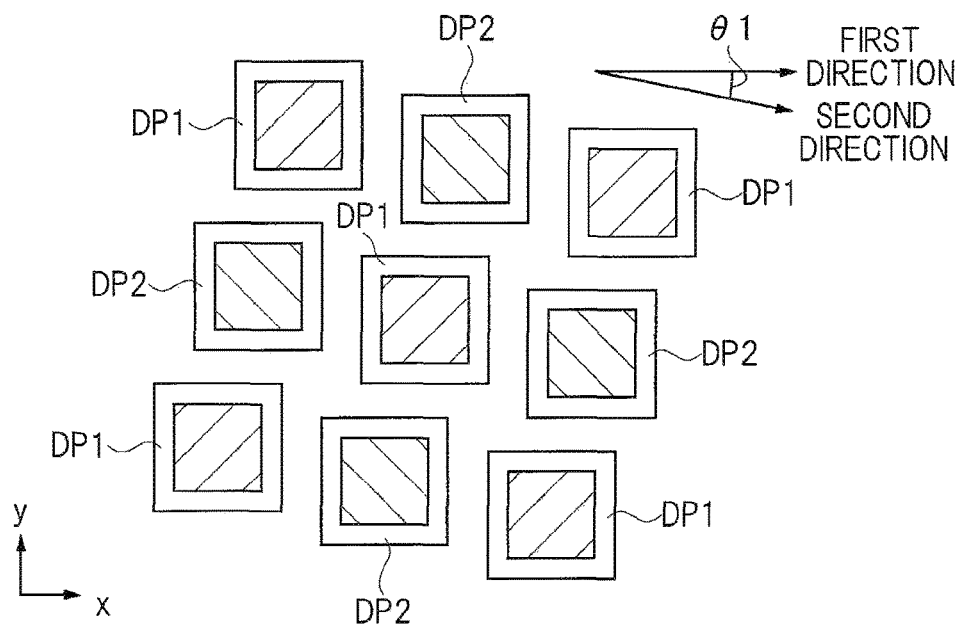
FIG. 10 is a plan view of a main part illustrating an example in which dummy patterns are disposed according to the first embodiment.
Figure 11:
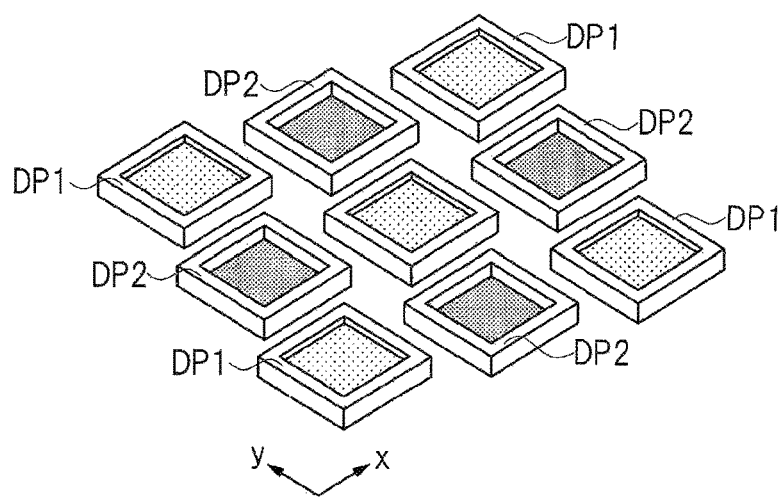
FIG. 11 is a perspective view of a main part illustrating an example in which dummy patterns are disposed according to the first embodiment.

A method for manufacturing a semiconductor device according to the first embodiment will be described below in the order of steps with reference to FIGS. 3 through 22. FIG. 3 is a process flowchart illustrating a process for manufacturing the semiconductor device according to the first embodiment. FIGS. 4 through 9 and FIGS. 13 through 22 are cross-sectional views of a main part of the semiconductor device during the manufacturing process according to the first embodiment. FIG. 10 is a plan view of a main part illustrating an example in which dummy patterns are disposed according to the first embodiment. FIG. 11 is a perspective view of a main part illustrating an example in which dummy patterns are disposed according to the first embodiment. FIG. 12A is a plan view of a main part illustrating a first modification example of shapes of dummy patterns according to the first embodiment, and FIG. 12B a plan view of a main part illustrating a second modification example of shapes of dummy patterns according to the first embodiment. In FIGS. 4 through 9 and FIGS. 13 through 22, a first optical waveguide is formed in an A1 region, a second optical waveguide is formed in an A2 region, an optical modulator is formed in a B region, and dummy patterns are formed in a C region.

In the method for manufacturing a semiconductor device according to the first embodiment, the first optical waveguide OT1, the rib-shaped second optical waveguide OT2, and the rib-shaped optical modulator PC, each of which is composed of a semiconductor layer, are formed, and the semiconductor layer is processed in the order of full etching (steps P1-1 through P1-3), first half etching (steps P2-1 through P2-3), and second half etching (steps P3-1 through P3-3). Full etching is dry etching from an upper surface to a lower surface of the semiconductor layer, and half etching is dry etching from the upper surface of the semiconductor layer while leaving a predetermined thickness.

Figure 4:
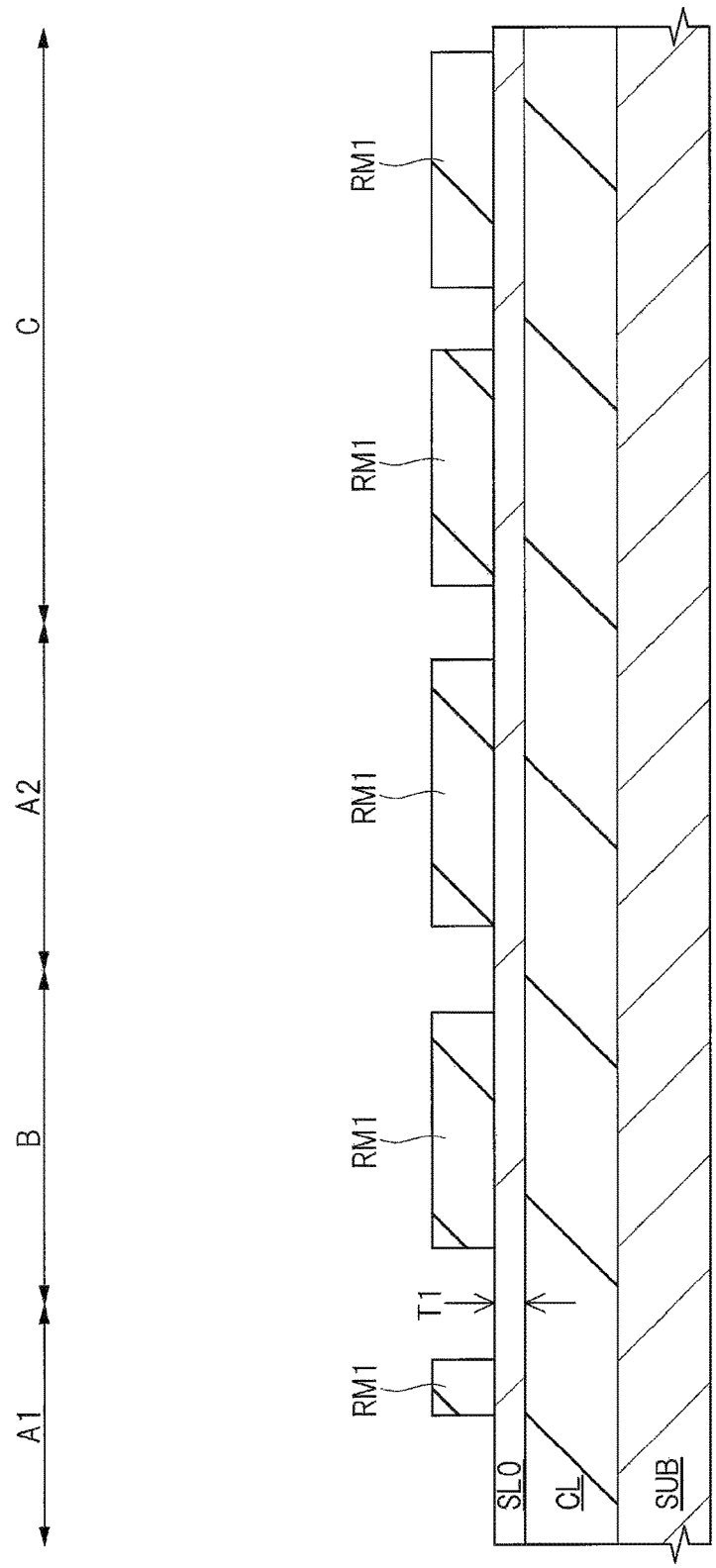
FIG. 4 is a cross-sectional view of a main part illustrating the process of manufacturing the semiconductor device according to the first embodiment.

First, as illustrated in FIG. 4, an SOI substrate (a substrate having a substantially circular planar shape and referred to as an SOI wafer at this stage) which is composed of the semiconductor substrate SUB, the insulating layer CL formed on the main surface of the semiconductor substrate SUB, and a semiconductor layer SL0 formed on the upper surface of the insulating layer CL, is prepared.

The semiconductor substrate SUB is a support substrate made of monocrystalline silicon (Si), the insulating layer CL is made of silicon oxide ($SiO_2$), and the semiconductor layer SL0 is made of silicon (Si). A thickness of the semiconductor substrate SUB is, for example, approximately 750 μm. A thickness of the insulating layer CL is, for example, approximately 2 μm to 3 μm. A thickness T1 of the semiconductor layer SL0 is, for example, approximately 100 nm to 300 nm, preferably approximately 200 nm.

Next, a resist mask RM1 for processing the semiconductor layer SL0 is formed (step P1-1).

Figure 5:
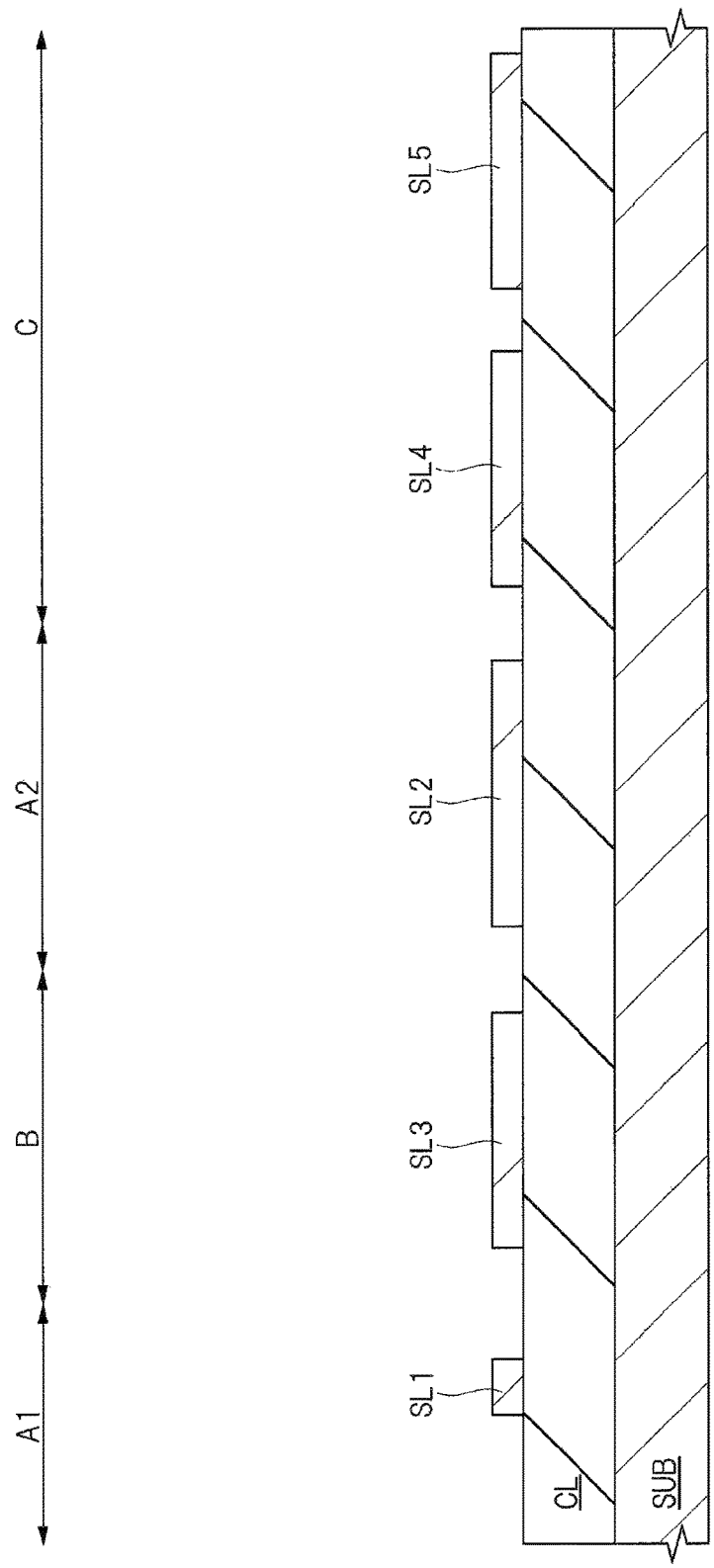
FIG. 5 is a cross-sectional view of a main part illustrating the process of manufacturing the semiconductor device subsequent to FIG. 4.

Next, as illustrated in FIG. 5, a semiconductor layer SL1 for a first optical waveguide, a semiconductor layer SL2 for a second optical waveguide, and a semiconductor layer SL3 for an optical modulator are formed by processing the semiconductor layer SL0 by dry etching (full etching) through use of the resist mask RM1 (step P1-2). For example, hydrogen bromide (HBr) or the like is used as an etching gas.

In this step, semiconductor layers SL4 and SL5 for dummy patterns are also formed in order to suppress a micro-loading effect. As illustrated in FIG. 4, the area of an opening of the resist mask RM1 is equal to the area of the semiconductor layers SL4 and SL5 exposed from the resist mask RM1, and the semiconductor layers SL4 and SL5 exposed from the resist mask RM1 each have a uniform thickness which is equal to the thickness T1 of the initial semiconductor layer SL0. Accordingly, an effective pattern density does not change in full etching of the initial semiconductor layer SL0, and therefore, the semiconductor layers SL1, SL2, and SL3 each having desired dimensions and a desired shape can be formed.

Then, the resist mask RM1 is removed (step P1-3).

Figure 6:
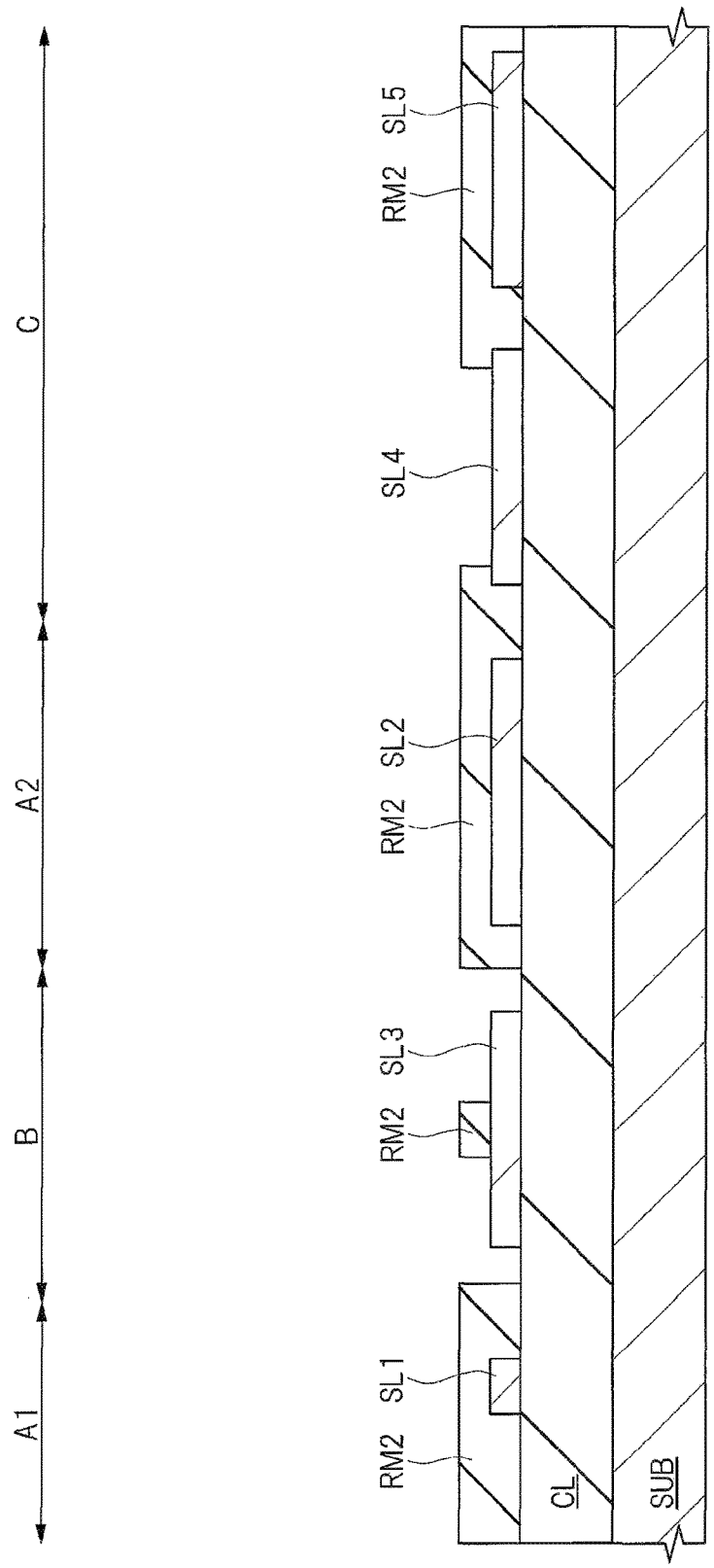
FIG. 6 is a cross-sectional view of a main part illustrating the process of manufacturing the semiconductor device subsequent to FIG. 5.

Next, as illustrated in FIG. 6, a resist mask RM2 for processing the semiconductor layer SL3 for the optical modulator into a rib shape is formed (step P2-1).

Figure 7:
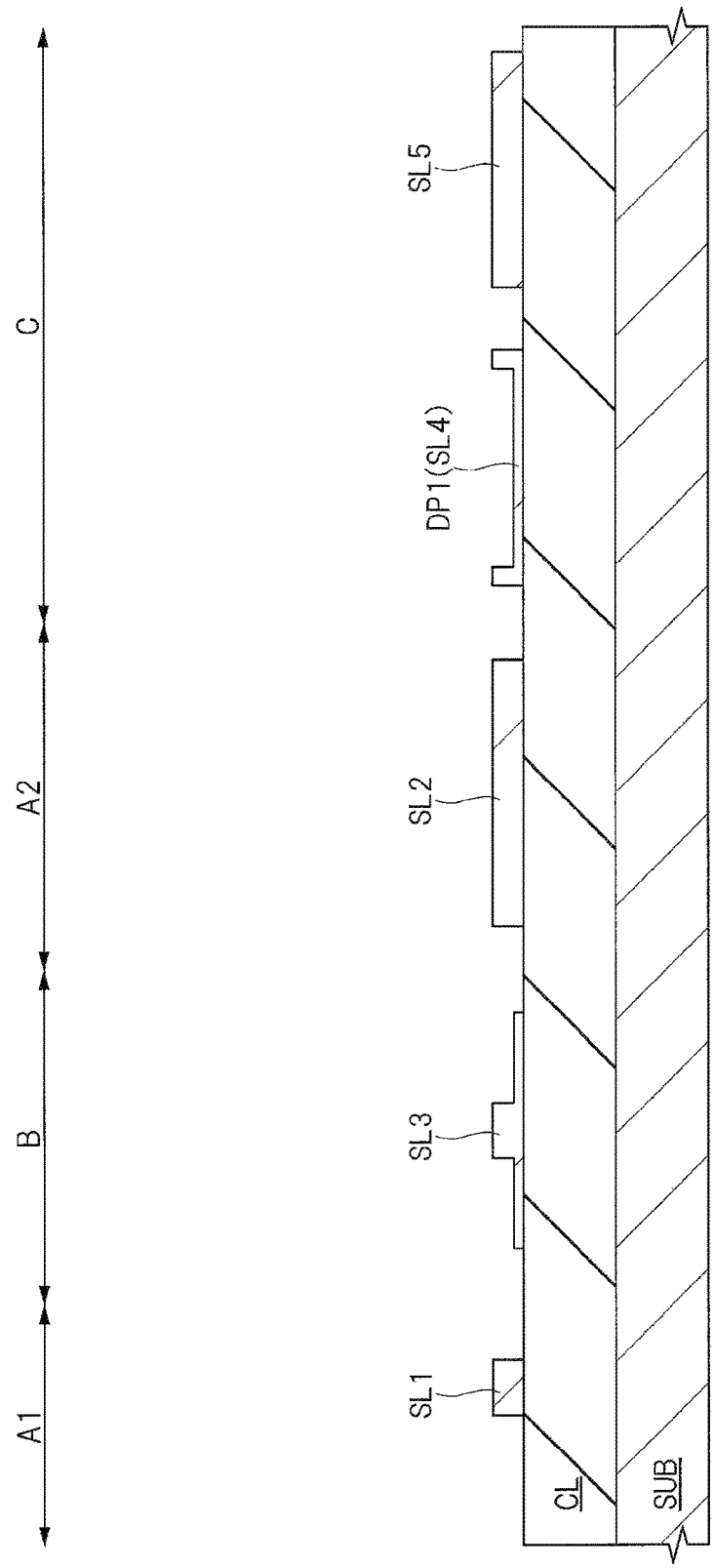
FIG. 7 is a cross-sectional view of a main part illustrating the process of manufacturing the semiconductor device subsequent to FIG. 6.

Next, as illustrated in FIG. 7, the rib-shaped semiconductor layer SL3 for the optical modulator is formed by processing the semiconductor layer SL3 for the optical modulator by dry etching (first half etching) through use of the resist mask RM2 (step P2-2). A thickness of a rib portion of the semiconductor layer SL3 for the optical modulator is equal to the thickness T1 of the initial semiconductor layer SL0, and is, for example, approximately 200 nm. In addition, the thickness of a portion other than the rib portion of the semiconductor layer SL3 for the optical modulator is smaller than the thickness T1 of the initial semiconductor layer SL0 and is, for example, approximately 50 nm.

In this step, a dummy pattern DP1 is formed by processing the semiconductor layer SL4 for the dummy pattern in order to suppress a micro-loading effect. Here, in a region in which the dummy pattern DP1 is formed, the area of an opening of the resist mask RM2 is equal to the area of the semiconductor layer SL4 exposed from the resist mask RM2, and the semiconductor layer SL4 exposed from the resist mask RM2 has a uniform thickness which is equal to the thickness T1 of the initial semiconductor layer SL0, as illustrated in FIG. 6. Accordingly, an effective pattern density does not change in half etching of the semiconductor layer SL4, and therefore, the rib-shaped semiconductor layer SL3 for the optical modulator having desired dimensions and a desired shape can be formed.

Note that, in a region in which the semiconductor layer SL3 for the optical modulator is formed, the area of the opening of the resist mask RM2 is different from the area of the semiconductor layer SL3 exposed from the resist mask RM2 from the start of half etching. However, the ratio of the area occupied by a thin portion of the semiconductor layer SL3 to the semiconductor chip is less than 1%, and therefore, the above difference hardly affects the dimensions and shape of the semiconductor layer SL3 for the optical modulator.

Then, the resist mask RM2 is removed (step P2-3).

Figure 8:
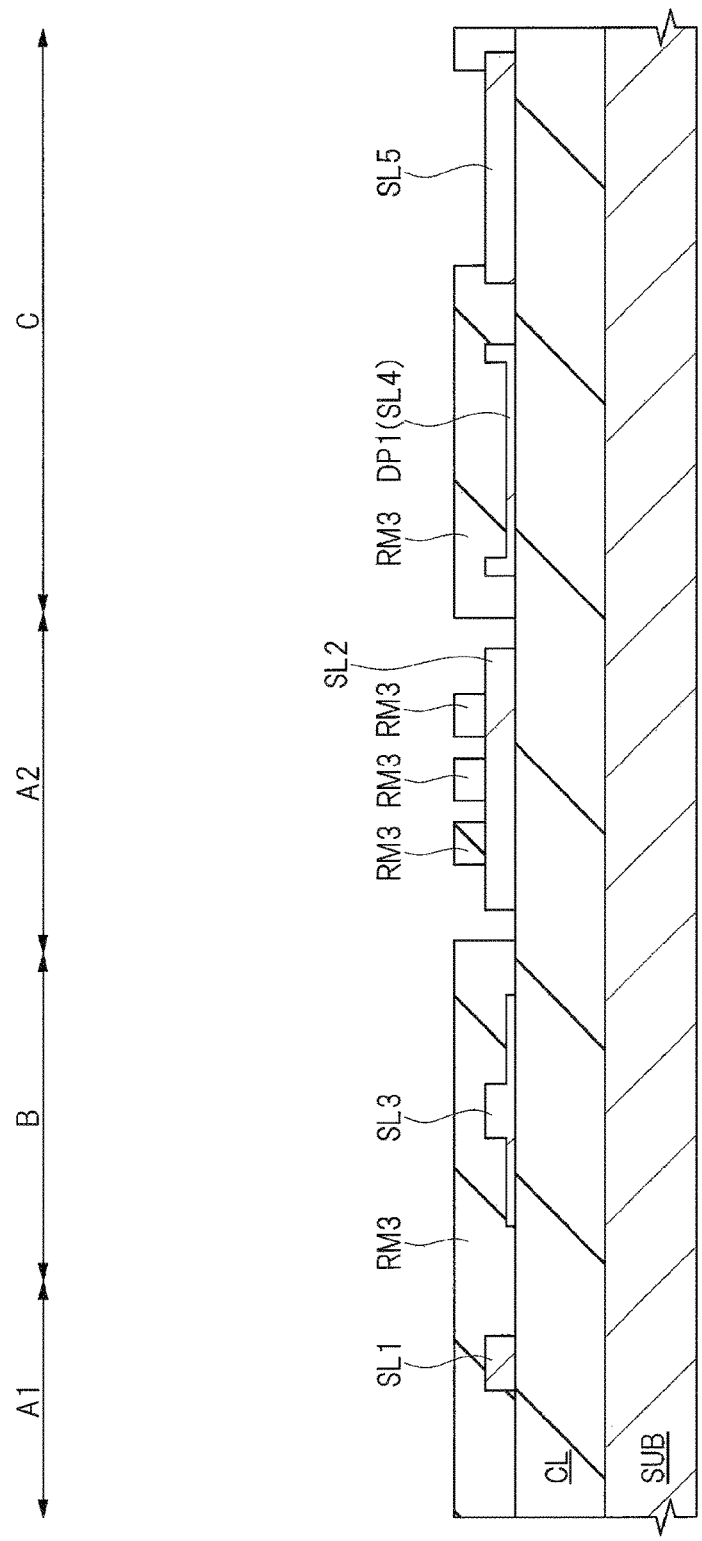
FIG. 8 is a cross-sectional view of a main part illustrating the process of manufacturing the semiconductor device subsequent to FIG. 7.

Next, as illustrated in FIG. 8, a resist mask RM3 for processing the semiconductor layer SL2 for the second optical waveguide into a rib shape is formed (step P3-1).

Next, as illustrated in FIG. 9, the rib-shaped semiconductor layer SL2 for the second optical waveguide is formed by processing the semiconductor layer SL2 for the second optical waveguide by dry etching (second half etching) through use of the resist mask RM3 (step P3-2). A thickness of a rib portion of the semiconductor layer SL2 for the second optical waveguide is equal to the thickness T1 of the initial semiconductor layer SL0 and is, for example, approximately 200 nm. Also, a thickness of a portion other than the rib portion of the semiconductor layer SL2 for the second optical waveguide is smaller than the thickness T1 of the initial semiconductor layer SL0 and larger than the thickness of the portion other than the rib portion of the semiconductor layer SL3 for the optical modulator and is, for example, approximately 100 nm.

In this step, a dummy pattern DP2 is formed by processing the semiconductor layer SL5 for the dummy pattern that is not used in processing of the semiconductor layer SL3 for the optical modulator in order to suppress a micro-loading effect. Here, in a region in which the dummy pattern DP2 is formed, the area of an opening of the resist mask RM3 is equal to the area of the semiconductor layer SL5 exposed from the resist mask RM3, and the semiconductor layer SL5 exposed from the resist mask RM3 has a uniform thickness which is equal to the thickness T1 of the initial semiconductor layer SL0, as illustrated in FIG. 8. Accordingly, an effective pattern density does not change in half etching of the semiconductor layer SL5, and therefore, the rib-shaped semiconductor layer SL2 for the second optical waveguide having desired dimensions and a desired shape can be formed.

Note that, in a region in which the semiconductor layer SL2 for the second optical waveguide is formed, the area of the opening of the resist mask RM3 is different from the area of the semiconductor layer SL2 exposed from the resist mask RM3 from the start of half etching. However, the ratio of the area occupied by a thin portion of the semiconductor layer SL2 to the semiconductor chip is less than 1%, and therefore, the above difference hardly affects the dimensions and shape of the semiconductor layer SL2 for the second optical waveguide.

Then, the resist mask RM3 is removed (step P3-3).

In the meantime, it is desirable that edge portions of the resist mask RM2 be disposed on the semiconductor layer SL4 for the dummy pattern in consideration of an alignment margin between the semiconductor layer SL4 for the dummy pattern and the resist mask RM2 so that the area of the semiconductor layer SL4 for the dummy pattern does not change in the middle of dry etching. Similarly, it is desirable that edge portions of the resist mask RM3 be disposed on the semiconductor layer SL5 for the dummy pattern in consideration of an alignment margin between the semiconductor layer SL5 for the dummy pattern and the resist mask RM3 so that the area of the semiconductor layer SL5 for the dummy pattern does not change in the middle of dry etching.

FIG. 10 is a plan view of a main part illustrating an example of the dummy patterns formed by processing the semiconductor layer for dummy patterns, and FIG. 11 is a perspective view of a main part illustrating an example of the dummy patterns formed by processing the semiconductor layer for dummy patterns.

For example, as illustrated in FIGS. 10 and 11, the dummy patterns DP1 and DP2 having a square shape whose side is approximately 1 μm to 50 μm can be used. The dummy pattern DP1 used in formation of the rib-shaped semiconductor layer SL3 for the optical modulator and the dummy pattern DP2 used in formation of the rib-shaped semiconductor layer SL2 for the second optical waveguide are alternately disposed, and accordingly, the dummy pattern DP1 and the dummy pattern DP2 can be disposed evenly in a dummy pattern region. Note that the shapes of the dummy patterns DP1 and DP2 are not limited to a quadrangular shape and the way in which the dummy patterns DP1 and DP2 are arranged is not limited to the one illustrated in FIG. 10 in which the dummy patterns DP1 and DP2 are disposed obliquely.

Furthermore, the edge portions of the resist mask RM2 be disposed on the semiconductor layer SL4 for the dummy pattern in consideration of an alignment margin between the semiconductor layer SL4 for the dummy pattern and the resist mask RM2 so that the area of the semiconductor layer SL4 for the dummy pattern does not change in the middle of dry etching. Similarly, the edge portions of the resist mask RM3 be disposed on the semiconductor layer SL5 for the dummy pattern in consideration of an alignment margin between the semiconductor layer SL5 for the dummy pattern and the resist mask RM3 so that the area of the semiconductor layer SL5 for the dummy pattern does not change in the middle of dry etching. Accordingly, thicknesses of outer peripheral portions of the dummy patterns DP1 and DP2 is larger than those of central portions of the dummy patterns DP1 and DP2. The outer peripheral portions of the dummy patterns DP1 and DP2 are, for example, portions that have a width of approximately 0.1 µm to 10 µm inwardly from the peripheral edges of the dummy patterns DP1 and DP2.

As for the way in which the dummy patterns DP1 and DP2 are disposed, it is also possible to employ a configuration in which the dummy patterns DP1 and DP2 are disposed in groups as illustrated in FIGS. 12A and 12B.

Next, as illustrated in FIG. 13, p-type impurities are introduced into a portion (a portion where the p-type semiconductor PR is formed) of the semiconductor layer SL3 for the optical modulator, and n-type impurities are introduced into the other portion (a portion where the n-type semiconductor NR is formed) (step P4). Then, activation annealing is performed (step P5).

Through the above steps, the first optical waveguide OT1 that is composed of the semiconductor layer SL1 for the first optical waveguide is formed. Furthermore, the second optical waveguide OT2 that is composed of the rib-shaped semiconductor layer SL2 for the second optical waveguide, for example the grating coupler GC is formed. Furthermore, the rib-shaped optical modulator PC having a pin structure that is composed of the optical waveguide WO, the p-type semiconductor PR positioned on one side of the optical waveguide WO, and the n-type semiconductor NR positioned on the other side of the optical waveguide WO is formed. Furthermore, the dummy patterns DP1 and DP2 having a quadrangular shape whose side approximately 1 µm to 50 µm are formed. The dummy patterns DP1 and DP2 are disposed around the first optical waveguide OT1, the second optical waveguide OT2, and the optical modulator PC.

Next, as illustrated in FIG. 14, the first interlayer insulating film ID1 is formed on the upper surface of the insulating layer CL so as to cover the first optical waveguide OT1, the second optical waveguide OT2, the optical modulator PC, and the dummy patterns DP1 and DP2. The first interlayer insulating film ID1 is made, for example, of silicon oxide ($SiO_2$) formed by the plasma CVD (Chemical Vapor Deposition), and the thickness of the first interlayer insulating film ID1 is, for example, 1 µm or more. Next, the upper surface of the first interlayer insulating film ID1 is planarized by the CMP (Chemical Mechanical Polishing) or the like (step P6).

Next, as illustrated in FIG. 15, the connection holes CT1 that reach the p-type semiconductor PR and the n-type semiconductor NR of the optical modulator PC, respectively, are formed in the first interlayer insulating film ID1 (step P7).

Next, as illustrated in FIG. 16, the connection holes CT1 are filled with a conductive film, and the first plugs PL1 composed of the filled conductive film are formed. The first plugs PL1 are made, for example, of aluminum (Al) or tungsten (W) (step P8).

Next, as illustrated in FIG. 17, a metal film such as an aluminum (Al) film is deposited on the upper surface of the first interlayer insulating film ID1 by sputtering (step P9), and then the wires M1 of the first layer are formed by processing this metal film by dry etching through use of a resist mask (step P10).

Next, as illustrated in FIG. 18, the second interlayer insulating film ID2 is formed on the upper surface of the first interlayer insulating film ID1 so as to cover the wires M1 of the first layer. The second interlayer insulating film ID2 is made, for example, of silicon oxide ($SiO_2$) formed by the plasma CVD, and the thickness of the second interlayer insulating film ID2 is, for example, 1 µm or more. Next, the upper surface of the second interlayer insulating film ID2 is planarized by the CMP (step P11).

Next, as illustrated in FIG. 19, the connection holes CT2 that reach the wires M1 of the first layer are formed in the second interlayer insulating film ID2 (step P12).

Next, as illustrated in FIG. 20, the connection holes CT2 are filled with a conductive film, and the second plugs PL2 composed of the filled conductive film are formed. The second plugs PL2 are made, for example, of aluminum (Al) or tungsten (W) (step P13).

Next, as illustrated in FIG. 21, a metal film such as an aluminum (Al) film is deposited on the upper surface of the second interlayer insulating film ID2 by sputtering method (step P14), and then the wires M2 of the second layer are formed by processing this metal film by dry etching through use of a resist mask (step P15).

Then, as illustrated in FIG. 22, the protective film TC is formed so as to cover the wires M2 of the second layer. The protective film TC is made, for example, of silicon oxynitride (SiON) (step P16). Then, upper surfaces of the wires M2 of the second layer are exposed by processing the protective film TC (step P17). This substantially completes the semiconductor device according to the first embodiment.

As described above, according to the first embodiment, when a semiconductor layer is etched, the area of an opening of a resist mask is equal to the area of a semiconductor layer exposed from the resist mask, and the semiconductor layer exposed from the resist mask has a uniform thickness which is equal to the thickness of the initial semiconductor layer, in a region in which dummy patterns are formed. It is therefore possible to achieve a semiconductor device having optical waveguides whose dimensions and shapes have small variations, even in a case where a resist mask is prepared from mask data in which an optimum pattern density capable of controlling dimensions and a shape of the semiconductor layer is selected and the semiconductor layer is processed through use of this resist mask.

Second Embodiment

Structures of a first optical waveguide OT1, a rib-shaped second optical waveguide OT2, and a rib-shaped optical modulator PC according to a second embodiment are almost identical to those of the first optical waveguide OT1, the rib-shaped second optical waveguide OT2, and the rib-shaped optical modulator PC described in the first embodiment. The second embodiment is different from the first embodiment in manufacturing processes of the first optical waveguide OT1, the rib-shaped second optical waveguide OT2, and the rib-shaped optical modulator PC. The other manufacturing processes are almost identical to those described in the first embodiment, and therefore the differences will mainly be described below.

A method for manufacturing a semiconductor device according to the second embodiment will be described below in the order of steps with reference to FIGS. 23 through 29. FIG. 23 is a process flow chart illustrating a process for manufacturing the semiconductor device according to the second embodiment. FIGS. 24 through 29 are cross-sectional views of a main part of the semiconductor device during the manufacturing process according to the second embodiment. In FIGS. 24 through 29, a first optical waveguide is formed in an A1 region, a second optical waveguide is formed in an A2 region, an optical modulator is formed in a B region, and dummy patterns are formed in a C region.

In the method for manufacturing a semiconductor device according to the second embodiment, the first optical waveguide OT1, the rib-shaped second optical waveguide OT2, and the rib-shaped optical modulator PC, each of which is composed of a semiconductor layer, are formed, and the semiconductor layer is processed in the order of first half etching (steps P1-1 to P1-3), second half etching (steps P2-1 to P2-3), and full etching (steps P3-1 to P3-3).

First, as illustrated in FIG. 24, an SOI substrate which is composed of a semiconductor substrate SUB, an insulating layer CL formed on a main surface of the semiconductor substrate SUB, and a semiconductor layer SL0 formed on an upper surface of the insulating layer CL, is prepared. A thickness T1 of the semiconductor layer SL0 is, for example, approximately 100 nm to 300 nm, preferably approximately 200 nm. In FIG. 24, the semiconductor layer SL0 indicated by the reference character "SL1" is a semiconductor layer for a first optical waveguide. Similarly, the reference character "SL2" indicates a semiconductor layer for a second optical waveguide, the reference character "SL3" indicates a semiconductor layer for an optical modulator, and the reference characters "SL4" and "SL5" each indicate a semiconductor layer for a dummy pattern.

Next, a resist mask RM4 for processing the semiconductor layer SL3 for the optical modulator into a rib shape is formed (step P1-1).

Next, as illustrated in FIG. 25, the semiconductor layer SL3 for the optical modulator is processed into a rib shape by performing dry etching (first half etching) of the semiconductor layer SL3 for the optical modulator, through use of the resist mask RM4 (step P1-2). A thickness of a rib portion of the semiconductor layer SL3 for the optical modulator is equal to the thickness T1 of the initial semiconductor layer SL0 and is, for example, approximately 200 nm. A thickness of a portion other than the rib portion of the semiconductor layer SL3 for the optical modulator is smaller than the thickness T1 of the initial semiconductor layer SL0 and is, for example, approximately 50 nm.

In this step, the semiconductor layer SL4 for the dummy pattern is also processed in order to suppress a micro-loading effect. Here, in a region in which the semiconductor layer SL4 for the dummy pattern is processed, the area of an opening of the resist mask RM4 is equal to the area of the semiconductor layer SL4 exposed from the resist mask RM4, and the semiconductor layer SL4 exposed from the resist mask RM4 has a uniform thickness which is equal to the thickness T1 of the initial semiconductor layer SL0. Accordingly, an effective pattern density does not change in half etching of the semiconductor layer SL4, and therefore, the rib-shaped semiconductor layer SL3 for the optical modulator having desired dimensions and a desired shape can be formed.

Then, the resist mask RM4 is removed (step P1-3).

Next, as illustrated in FIG. 26, a resist mask RM5 for processing the semiconductor layer SL2 for the second optical waveguide into a rib shape is formed (step P2-1).

Next, as illustrated in FIG. 27, the semiconductor layer SL2 for the second optical waveguide is processed into a rib shape by performing dry etching (second half etching) of the semiconductor layer SL2 for the second optical waveguide, through use of the resist mask RM5 (step P2-2). A thickness of a rib portion of the semiconductor layer SL2 for the second optical waveguide is equal to the thickness T1 of the initial semiconductor layer SL0 and is, for example, approximately 200 nm. In addition, the thickness of a portion other than the rib portion of the semiconductor layer SL2 for the second optical waveguide is smaller than the thickness T1 of the initial semiconductor layer SL0 and larger than the thickness of the portion other than the rib portion of the semiconductor layer SL3 for the optical modulator and is, for example, approximately 100 nm.

In this step, the semiconductor layer SL5 for the dummy pattern that is not used in processing of the semiconductor layer SL3 for the optical modulator is also processed in order to suppress a micro-loading effect. Here, in a region in which the semiconductor layer SL5 for the dummy pattern is processed, the area of an opening of the resist mask RM5 is equal to the area of the semiconductor layer SL5 exposed from the resist mask RM5, and the semiconductor layer SL5 exposed from the resist mask RM5 has a uniform thickness which is equal to the thickness T1 of the initial semiconductor layer SL0. Accordingly, an effective pattern density does not change in half etching of the semiconductor layer SL5, and therefore, the rib-shaped semiconductor layer SL2 for the second optical waveguide having desired dimensions and a desired shape can be formed.

Then, the resist mask RM5 is removed (step P2-3).

Next, as illustrated in FIG. 28, a resist mask RM6 for separating and processing the semiconductor layer SL1 for the first optical waveguide, the semiconductor layer SL2 for the second optical waveguide, and the semiconductor layer SL3 for the optical modulator is formed (step P3-1).

Next, as illustrated in FIG. 29, the semiconductor layer SL1 for the first optical waveguide, the semiconductor layer SL2 for the second optical waveguide, and the semiconductor layer SL3 for the optical modulator are separated and processed by processing the semiconductor layers SL1, SL2, and SL3 by dry etching (full etching) through use of the resist mask RM6 (step P3-2).

In this step, the semiconductor layers SL4 and SL5 for the dummy patterns are also separated and processed in order to suppress a micro-loading effect. Here, in a region in which the semiconductor layers SL4 and SL5 for the dummy patterns are processed, the area of an opening of the resist mask RM6 is equal to the area of the semiconductor layers SL4 and SL5 exposed from the resist mask RM6, and the semiconductor layers SL4 and SL5 exposed from the resist mask RM6 have a uniform thickness which is equal to the thickness T1 of the initial semiconductor layer SL0. Accordingly, an effective pattern density does not change in full etching of the semiconductor layers SL4 and SL5, and therefore, the semiconductor layer SL1 for the first optical waveguide, the semiconductor layer SL2 for the second optical waveguide, and the semiconductor layer SL3 for the optical modulator each having desired dimensions and a desired shape can be formed.

Note that, in a region in which the semiconductor layer SL2 for the second optical waveguide and the semiconductor layer SL3 for the optical modulator are formed, the semiconductor layers SL2 and SL3 having different thicknesses from each other are formed from the start of full etching. Accordingly, the area of the opening of the resist mask RM6 is different from the area of the semiconductor layers SL2 and SL3 exposed from the resist mask RM6 in the middle of dry etching. However, since the ratio of the area occupied by the thin portions of the semiconductor layers SL2 and SL3 to the semiconductor chip is less than 1%, the above difference hardly affects dimensions and shapes of the semiconductor layer SL2 for the second optical waveguide and the semiconductor layer SL3 for the optical modulator.

Then, the resist mask RM6 is removed (step P3-3).

Next, p-type impurities are introduced into a portion (a portion where a p-type semiconductor PR is formed) of the semiconductor layer SL3 for the optical modulator, and n-type impurities are introduced into the other portion (a portion where an n-type semiconductor NR is formed) (step P4). Then, activation annealing is performed (step P5).

Through the above steps, the first optical waveguide OT1 that is composed of the semiconductor layer SL1 for the first optical waveguide is formed. Furthermore, the rib-shaped second optical waveguide OT2 that is composed of the semiconductor layer SL2 for the second optical waveguide, for example, a grating coupler GC is formed. Furthermore, the rib-shaped optical modulator PC having a pin structure that is composed of an optical waveguide WO, the p-type semiconductor PR positioned on one side of the optical waveguide WO, and the n-type semiconductor NR positioned on the other side of the optical waveguide WO is formed. Furthermore, dummy patterns DP1 and DP2 having a quadrangular shape whose side is approximately 1 μm to 50 μm are formed. These dummy patterns DP1 and DP2 are disposed around the first optical waveguide OT1, the second optical waveguide OT2, and the optical modulator PC.

Then, wires M1 of a first layer, wires M2 of a second layer, and the like are formed (steps P6 to P17) in the same manner as that in the first embodiment. This substantially completes the semiconductor device according to the second embodiment.

As described above, according to the second embodiment, it is possible to obtain substantially the same effects as those in the first embodiment.

In the foregoing, the invention made by the inventors of the present invention has been concretely described based on the embodiments. However, it is needless to say that the present invention is not limited to the foregoing embodiments and various modifications and alterations can be made within the scope of the present invention.

What is claimed is:

1. A method for manufacturing a semiconductor device including a first optical waveguide, a second optical waveguide, a first dummy pattern, and a second dummy pattern, the method comprising:
    preparing a substrate composed of a semiconductor substrate, a first insulating film formed on the semiconductor substrate, and a semiconductor layer having a first thickness and formed on the first insulating film;
    separating the semiconductor layer for the first optical waveguide, the semiconductor layer for the second optical waveguide, the semiconductor layer for the first dummy pattern, and the semiconductor layer for the second dummy pattern from one another by dry etching using a first resist mask;
    processing a portion of the semiconductor layer for the first optical waveguide and a portion of the semiconductor layer for the first dummy pattern into a second thickness smaller than the first thickness by dry etching using a second resist mask; and
    processing a portion of the semiconductor layer for the second optical waveguide and a portion of the semiconductor layer for the second dummy pattern into a third thickness smaller than the first thickness by dry etching using a third resist mask,
    wherein the second resist mask covers an outer peripheral portion of the semiconductor layer for the first dummy pattern in the processing of the portion of the semiconductor layer for the first optical waveguide and the portion of the semiconductor layer for the first dummy pattern, and
    wherein the third resist mask covers an outer peripheral portion of the semiconductor layer for the second dummy pattern in the processing of the portion of the semiconductor layer for the second optical waveguide and the portion of the semiconductor layer for the second dummy pattern.

2. The method for manufacturing a semiconductor device according to claim 1, wherein the second thickness is different from the third thickness.

3. The method for manufacturing a semiconductor device according to claim 1, wherein a cross section of the first dummy pattern is processed into a recessed shape in the processing of the portion of the semiconductor layer for the first optical waveguide and the portion of the semiconductor layer for the first dummy pattern, and
    wherein a cross section of the second dummy pattern is processed into a recessed shape in the processing of the portion of the semiconductor layer for the second optical waveguide and the portion of the semiconductor layer for the second dummy pattern.

4. The method for manufacturing a semiconductor device according to claim 1, wherein a cross section of the first dummy pattern is processed into a recessed shape in the processing of the portion of the semiconductor layer for the first optical waveguide and the portion of the semiconductor layer for the first dummy pattern.

5. The method for manufacturing a semiconductor device according to claim 1, wherein a cross section of the second dummy pattern is processed into a recessed shape in the processing of the portion of the semiconductor layer for the second optical waveguide and the portion of the semiconductor layer for the second dummy pattern.

6. The method for manufacturing a semiconductor device according to claim 1, wherein the outer peripheral portion of the semiconductor layer for the first dummy pattern, which is covered by the second resist mask, extends on side surfaces of the semiconductor layer for the first dummy pattern that extend from a top surface of the semiconductor layer for the first dummy pattern on which the portion of the semiconductor layer for the first dummy pattern is located.

7. The method for manufacturing a semiconductor device according to claim 1, wherein the outer peripheral portion of the semiconductor layer for the second dummy pattern, which is covered by the third resist mask, extends on side surfaces of the semiconductor layer for the second dummy pattern that extend from a top surface of the semiconductor layer for the first dummy pattern on which the portion of the semiconductor layer for the second dummy pattern is located.

8. The method for manufacturing a semiconductor device according to claim 1, wherein the portion of the semiconductor layer for the first dummy pattern is located on a top surface of the semiconductor layer for the first dummy pattern, and
    wherein the second resist mask covers another portion of the semiconductor layer for the first dummy pattern that is located on the top surface of the semiconductor layer for the first dummy pattern.

9. The method for manufacturing a semiconductor device according to claim 1, wherein the portion of the semiconductor layer for the second dummy pattern is located on a top surface of the semiconductor layer for the second dummy pattern, and
    wherein the third resist mask covers another portion of the semiconductor layer for the second dummy pattern that is located on the top surface of the semiconductor layer for the second dummy pattern.

10. The method for manufacturing a semiconductor device according to claim 1, wherein, during the processing of the portion of the semiconductor layer in the region in which the first optical waveguide is formed and the portion of the semiconductor layer in the region in which the first dummy pattern is formed, an area of a top surface of the semiconductor layer for the first dummy pattern that is exposed outside the second resist mask is less than an entire area of the top surface of the semiconductor layer for the first dummy pattern.

11. The method for manufacturing a semiconductor device according to claim 1, wherein, during the processing of the portion of the semiconductor layer in the region in which the second optical waveguide is formed and the portion of the semiconductor layer in the region in which the second dummy pattern is formed, an area of a top surface of the semiconductor layer for the second dummy pattern that is exposed outside the third resist mask is less than an entire area of the top surface of the semiconductor layer for the second dummy pattern.

12. A method for manufacturing a semiconductor device including a first optical waveguide, a second optical waveguide, a first dummy pattern, and a second dummy pattern, the method comprising:
    preparing a substrate composed of a semiconductor substrate, a first insulating film formed on the semiconductor substrate, and a semiconductor layer having a first thickness and formed on the first insulating film;
    processing a portion of the semiconductor layer in a region in which the first optical waveguide is formed and a portion of the semiconductor layer in a region in which the first dummy pattern is formed into a second thickness smaller than the first thickness by dry etching using a first resist mask;
    processing a portion of the semiconductor layer in a region in which the second optical waveguide is formed and a portion of the semiconductor layer in a region in which the second dummy pattern is formed into a third thickness smaller than the first thickness by dry etching using a second resist mask; and
    separating the semiconductor layer for the first optical waveguide, the semiconductor layer for the second optical waveguide, the semiconductor layer for the first dummy pattern, and the semiconductor layer for the second dummy pattern from one another by dry etching using a third resist mask,
    wherein the first resist mask covers an outer peripheral portion of the semiconductor layer for the first dummy pattern in the processing of the portion of the semiconductor layer in the region in which the first optical waveguide is formed and the portion of the semiconductor layer in a region in which the first dummy pattern is formed, and
    wherein the second resist mask covers an outer peripheral portion of the semiconductor layer for the second dummy pattern in the processing of the portion of the semiconductor layer in the region in which the second optical waveguide is formed and the portion of the semiconductor layer in the region in which the second dummy pattern is formed.

13. The method for manufacturing a semiconductor device according to claim 12, wherein the second thickness is different from the third thickness.

14. The method for manufacturing a semiconductor device according to claim 12, wherein a cross section of the first dummy pattern is processed into a recessed shape in the processing of the portion of the semiconductor layer in the region in which the first optical waveguide is formed and the portion of the semiconductor layer in a region in which the first dummy pattern is formed, and
    a cross section of the second dummy pattern is processed into a recessed shape in the processing of the portion of the semiconductor layer in the region in which the second optical waveguide is formed and the portion of the semiconductor layer in the region in which the second dummy pattern is formed.

* * * * *